US006473966B1

(12) United States Patent
Kohno et al.

(10) Patent No.: US 6,473,966 B1
(45) Date of Patent: Nov. 5, 2002

(54) METHOD OF MANUFACTURING INK-JET PRINTER HEAD

(75) Inventors: Ichiro Kohno; Junji Shiota; Hideki Kamada, all of Tokyo; Satoshi Kanemitsu, Saitama; Yoshihiro Kawamura, Tokyo, all of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/494,116

(22) Filed: Jan. 27, 2000

(30) Foreign Application Priority Data

Feb. 1, 1999 (JP) .......................................... 11-023373
Jul. 1, 1999 (JP) .......................................... 11-187516

(51) Int. Cl.[7] .......................... B21D 53/76; B23P 17/00
(52) U.S. Cl. .......................... 29/890.1; 29/611; 216/23; 216/27; 216/42; 216/43; 216/44; 216/49; 347/26; 347/51; 347/56; 347/61; 347/63
(58) Field of Search .......................... 29/408, 509, 611, 29/890.1; 347/26, 51, 56, 61, 63; 216/23, 27, 42, 43, 44, 49, 67, 68

(56) References Cited

U.S. PATENT DOCUMENTS 4,558,333 A 12/1985 Sugitani et al. ............. 346/140
5,229,875 A * 7/1993 Leban ........................ 346/1.1
5,392,064 A 2/1995 Hadimioglu et al. ......... 347/46
5,442,384 A * 8/1995 Schantz ....................... 347/20
5,458,254 A * 10/1995 Miyagawa ................... 216/27
5,594,481 A * 1/1997 Keefe .......................... 347/65
5,625,693 A * 4/1997 Keefe .......................... 347/84
5,652,608 A * 7/1997 Watanabe ................... 347/50
5,655,291 A * 8/1997 Todd ........................... 29/830
5,682,187 A * 10/1997 Watanabe .................... 347/45
5,736,998 A * 4/1998 Caren .......................... 347/45
5,770,098 A * 6/1998 Araki .......................... 216/67
5,798,014 A * 8/1998 Weber ........................ 156/263
5,945,260 A * 8/1999 Miyagawa .................. 430/320
5,948,290 A * 9/1999 Yamamoto ............. 219/121.71
5,953,029 A * 9/1999 Keefe .......................... 347/65
5,989,757 A * 11/1999 Satoi ............................ 430/7
6,027,802 A * 2/2000 Lin ............................ 428/343
6,047,480 A * 4/2000 Powers ........................ 33/645
6,180,018 B1 * 1/2001 Miyagawa ................... 216/27
6,186,616 B1 * 2/2001 Inoue .......................... 347/45

FOREIGN PATENT DOCUMENTS

EP 0 738 603 A 10/1996
EP 0 750 992 A 1/1997
GB 2 302 842 A 2/1997

* cited by examiner

*Primary Examiner*—Peter Vo
*Assistant Examiner*—Paul Kim
(74) *Attorney, Agent, or Firm*—Frishauf, Holtz, Goodman & Chick, P.C.

(57) ABSTRACT

A printer head substrate having a silicon substrate on which heat generating elements and partitions are formed and an orifice plate which adhered to the partitions is placed on a stage of a helicon-wave dry etching system. Helicon-wave dry etching is performed while cooling the printer head substrate by allowing a coolant gas to be intervened between the substrate and the stage. This allows multiple orifices of a desired and adequate shape to be simultaneously and quickly bored in the orifice plate even if a thin film sheet having adhesive layers adhered to both sides thereof is used as the orifice plate, thereby improving the working efficiency.

5 Claims, 15 Drawing Sheets

| | THERMAL SEPARATION TEMPERATURE ¡C | TOTAL THICKNESS μm(TO 100-μm BASE) | ADHESIVE STRENGTH (g/20mm) BEFORE THERMAL SEPARATION | ADHESIVE STRENGTH (g/20mm) AFTER THERMAL SEPARATION |
|---|---|---|---|---|
| α | 90 | 145 | 320 | 0 |
| β | 120 | 145 | 500 | 0 |
| γ | 150 | 160 | 320 | 0 |

FIG.14

METHOD OF MANUFACTURING INK-JET PRINTER HEAD

BACKGROUND OF THE INVENTION

1. Field of the Invention

The present invention relates to a method of simultaneously and quickly forming (boring) orifices as ejection nozzles (hereinafter called "orifices") with the accurate shape in the orifice plate of an ink-jet printer head.

2. Description of the Related Art

Recently, ink-jet printers are widely used. The ink-jet printers include a thermal jet type which ejects ink droplets under the pressure of bubbles that are generated by heating the ink by means of a heat-generating resistor element and a piezoelectric type which ejects ink droplets by pressure that is applied to the ink by the deformation of a piezoelectric resistor element (piezoelectric element).

Because those types of printers do not require a developing step and transfer step and directly eject ink droplets on a recording medium to record information, they are advantageous over an electrophotographic type which uses powder-like toners in easy miniaturization and lower printing energy. The ink-jet printers are therefore popular particularly as personal printers.

The thermal jet type printer heads are classified into two structures depending on the ejection direction of ink droplets. The first type is a side-shooter type thermal ink-jet printer head which ejects ink droplets in a direction parallel to the heat generating surface of the heat-generating resistor element. The second one is a roof-shooter type or top-shooter type thermal ink-jet printer head which ejects ink droplets in a direction perpendicular to the heat generating surface of the heat-generating resistor element. The roof-shooter type thermal ink-jet printer head, in particular, is known for its very low power consumption.

FIG. 1A is a perspective view showing the structure of a printer equipped with such a roof-shooter type thermal ink-jet printer head, FIG. 1B is a plan view showing the ink ejecting side of the ink-jet printer head, FIG. 1C is a cross-sectional view from the direction of C–C' in FIG. 1B and FIG. 1D is a plan view exemplarily illustrating a silicon wafer from which this ink-jet printer head is manufactured A printer 1 shown in FIG. 1A is a compact printer for home and personal usage, and has a carriage 2 to which an ink-jet printer head 3 that prints and an ink cartridge 4 that retains ink are attached. The carriage 2 is supported slidable by a guide rail 5 and is also secured to a serrated drive belt 6. With this structure, the ink-jet printer head 3 and the ink cartridge 4 are reciprocally moved in the main print scanning direction indicated by a double-headed arrow B in the diagram. This ink-jet printer head 3 is connected to an unillustrated control unit in the main body of the printer 1 by a flexible communication cable 7. The control unit sends print data and control signals to the ink-jet printer head 3 via the flexible communication cable 7.

Located at the lower end portion of a frame 8 is a platen 9 which faces the ink-jet printer head 3 and extends in the main scanning direction of this head 3. Paper 10 is intermittently fed, in contact with the platen 9, in a printing sub-scanning direction indicated by an arrow C in the diagram by paper feed rollers 11 and paper discharge rollers 12. During the stationary period in the intermittent feeding of the paper 10, the ink-jet printer head 3 ejects ink droplets on the paper 10 in close proximity and prints on the paper 10 while being driven by a motor 13 via the serrated drive belt 6 and the carriage 2. Printing on the paper 10 is accomplished by repeating the intermittent feeding of the paper 10 and the ink ejection during the reciprocal movement of the ink-jet printer head 3.

While, as such a printer, monochromatic printers were the man stream in the past, full-color printers have recently become rather popular. The ink-jet printer head 3 for use in a fill-color printer has four parallel orifice columns 16 for ejecting four respective color inks formed on an orifice plate 15 which is laminated on a chip substrate 14 with a size of, for example, 10 mm×15 mm, as shown in FIG. 1B. Each orifice column 16 has 128 orifices 17 formed in a line for a resolution of 360 dpi, for example, or has 256 orifices 17 for a resolution of 720 dpi.

One way of manufacturing such an ink-jet printer head is to simultaneously form multiple orifices, a plurality of heat generating elements, and drivers which respectively drive those elements in a monolithic form by utilizing silicon LSI technology and thin film technology. According to this method, heat generating elements 18 and drivers 19 respectively associated with the 128 or 256 orifices 17 are formed on the same chip substrate 14.

Multiple ink-jet printer heads 3 are simultaneously formed on a silicon wafer 21 as shown in FIG. 1D. Formed on each of a predetermined number of chip substrates 14 are individual wiring electrodes 22 for driving the respective heat generating elements 18 and a common electrode 23, wiring leads 24 and power supply leads 25 connected to those electrodes, a partition 27 for forming ink flow passages 26, an ink feed hole 28 for receiving ink to be supplied from the external ink cartridge 4 to the ink flow passages 26 and a common ink feed groove 29 in addition to the orifices 17, the heat generating elements 18 and the drivers 19.

The ink-jet printer heads 3 whose individual components are formed in this manner on the silicon wafer 21 are finally cut out into individual units along scribe lines using a dicing saw or the like. Each separated unit is die-spotted to a mount substrate with its leads connected to those of the substrate, thereby completing the ink-jet printer head 3.

At the time of printing, the heat generating elements 18 in the ink-jet printer head 3 are selectively energized or activated in accordance with print information, spontaneously generating heat to cause a film boiling phenomenon on the inks. As a result, ink droplets are ejected from the orifices 17 corresponding to the heat generating elements 18 that have generated heat. According to this ink-jet printer head 3, the ink droplets are ejected in an approximately spherical shape corresponding in size to the diameter of the orifices 17 and are printed in about double the size on paper.

Conventionally, the orifices 17 are bored in the orifice plate 15 on each chip substrate 14 by using an excimer laser technique or wet or dry etching. According to the dry etching scheme, after a metal film of Al, Ni or Cu is laminated on the orifice plate 15, it is patterned and the orifice plate 15 is selectively etched by an ordinary dry etching system with the patterned metal film used as a mask.

In the step of boring the orifices, it is demanded to accurately form, for example, 128 orifices 17 of a predetermined size and shape at predetermined locations. The conventional method however has a difficulty in simultaneously and accurately forming the multiple orifices 17 of a predetermined size and shape in the thick orifice plate 15 at predetermined locations. Conventionally, therefore, orifices are formed an adequate quantity at a time, in the orifice plate, so that boring the whole orifices takes time.

SUMMARY OF THE INVENTION

Accordingly, it is an object of the present invention to provide a method of manufacturing an ink-jet printer head, which can simultaneously and accurately form multiple orifices as ejection nozzles at predetermined locations and in a predetermined size and shape in a short period of time.

To achieve this object, according to one aspect of this invention, there is provided a method of manufacturing an ink-jet printer head having a substrate provided with a plurality of energy generating elements for generating pressure energy for ejecting inks and an orifice plate located on the substrate and having a plurality of ejection nozzles formed therein for ejecting inks in a predetermined direction by pressure generated by the energy generating elements, the method comprising the steps of forming an etching mask film having a pattern corresponding to the ejection nozzles in the orifice plate before forming the ejection nozzles; and forming the plurality of ejection nozzles in the orifice plate by dry etching with helicon wave plasma source (hereinafter referred to as “helicon-wave dry etching”) while cooling a printer head substrate having the orifice plate with the mask film placed on the substrate.

According to this method, as ejection nozzles are bored while cooling the printer head substrate which is to be etched using helicon-wave dry etching that can ensure fast etching with a large ion current, it is possible to reliably prevent the temperature of the printer head substrate undergoing a treatment from excessively rising which would otherwise adversely affect the shape of the ejection nozzles to be bored. This can permit multiple ejection nozzles of the desired and adequate size and shape to be simultaneously and quickly bored.

It is preferable that in this method, the orifice plate is a multilayer sheet having a thermoplastic adhesive layer having a glass transition point higher than 200° C. deposited on each side of a polyimide sheet. In this case, the printer head substrate may be cooled to 200° C. or lower. This overcomes the conventional problem that the thermoplastic adhesive layers are thermally over-expanded to thereby adversely affect the forming of the ejection nozzles.

In the above method, it is preferable that the printer head substrate is cooled by cooling a bottom of the substrate with a coolant gas. In this case, when the ejection nozzles are bored through, the coolant gas is blown out of the ejection nozzles. The first adequate scheme of preventing this shortcoming is such that after an ink feed passage penetrating from the bottom of the substrate to a top surface thereof is formed, the ink feed passage is blocked before supply of the coolant gas starts, and after forming of the ejection nozzles is completed and supply of the coolant gas is stopped, blocking of the ink feed passage is released. In this case, the ink feed passage has only to be blocked by adhering a block sheet on the bottom of the substrate, and the blocking of the ink feed passage has only to be released by removing the block sheet.

The second adequate scheme of preventing the above shortcoming is such that before supply of the coolant gas starts, a plurality of ink leading passages extending from an ink feed passage penetrating from the bottom of the substrate to a top surface thereof to the energy generating elements provided on the top surface of the substrate are blocked, and after forming of the ejection nozzles is completed and supply of the coolant gas is stopped, blocking of the ink leading passages is released. In this case, the ink leading passages has only to be blocked by filling a dissolvable resin easily dissolvable by a solvent and the blocking of the ink leading passages has only to be released by dissolving the dissolvable resin.

It is preferable that the dissolvable resin is filled in such a way as to cover the energy generating elements. This prevents the energy generating elements from being damaged by over-etching.

The third adequate scheme of preventing the above shortcoming is such that the ejection nozzles are bored before an ink feed passage penetrating from the bottom of the substrate to a top surface thereof is opened. In this case, the ink feed passage has only to be formed by connecting an ink feed groove on a top surface side of the substrate to an ink feed hole on a bottom side of the substrate and one of the ink feed groove and the ink feed hole needs only to be formed to open the ink feed passage after forming of the ejection nozzles. It is more preferable that the ink feed hole is formed to open the ink feed passage after forming of the ejection nozzles.

The fourth adequate scheme of preventing the above shortcoming is such that after supply of the coolant gas to the bottom of the substrate of the printer head substrate starts, the helicon-wave dry etching is initiated and the supply of the coolant gas is stopped immediately after substantially all of the ejection nozzles are bored through. In this case, it is preferable that the timing at which substantially all of the ejection nozzles are bored through is detected from a change in a flow rate of the coolant gas.

To achieve the above object, according to another aspect of this invention, there is provided a method of manufacturing an ink-jet printer head for performing recording by applying pressure energy to ink and ejecting the ink onto a recording medium from a plurality of ejection nozzles, comprising the steps of arranging a plurality of energy generating elements for generating the pressure energy on a substrate; placing, as an orifice plate, a thin film sheet having adhesive layers adhered to both of top and bottom sides thereof on the substrate with the energy generating elements arranged thereon; and simultaneously boring a plurality of ejection nozzles in the orifice plate in association with the energy generating elements by dry etching while cooling a printer head substrate having the orifice plate placed on the substrate with a coolant gas applied to a back side of the substrate.

According to this method, even if a thin film sheet having thermoplastic adhesive layers adhered to both sides thereof, which is excellent in working efficiency, is used as an orifice plate, a rise in the overall temperature of the printer head substrate during dry etching is suppressed. This can prevent the thermoplastic adhesive layers from being thermally over-expanded, which would otherwise adversely affect the forming of the ejection nozzles and can permit multiple ejection nozzles of the desired and adequate size and shape to be simultaneously and quickly bored. It is therefore possible to provide a method of manufacturing an ink-jet printer head equipped with ejection nozzles of the desired and adequate size and shape at a high working efficiency.

According to the second method, if helicon-wave dry etching is used as dry etching, multiple ejection nozzles of the adequate shape can be bored faster. This further improves the throughput of the manufacture of ink-jet printer heads.

BRIEF DESCRIPTION OF THE DRAWINGS

These objects and other objects and advantages of the present invention will become more apparent upon reading of the following detailed description and the accompanying drawings in which:

FIG. 14 is a table showing a list of various characteristics of various kinds of thermal separation sheets adaptable to the manufacturing method of the first embodiment of this invention;

DETAILED DESCRIPTION OF THE PREFERRED EMBODIMENTS

Preferred embodiments of the present invention will now be described with reference to the accompanying drawings.

FIGS. 2A and 2B, FIGS. 3A and 3B and FIGS. 4A and 4B are schematic plan views and cross-sectional views illustrating the fabrication states at three phases, step by step, in a method of manufacturing a monolithic type ink-jet printer head according to a first embodiment of this invention. Although each of those diagrams shows only one printing head (having the same structure as a monochromatic ink-jet printer head) in a full-color ink-jet printer head for the sake of explanatory convenience, actually, a plurality of (normally four) printing heads of a similar type are formed, side by side, on a single chip substrate as will be discussed later. Although FIG. 4A exemplifies 36 orifices 44, multiple orifices, such as 64, 128 or 256 orifices, are actually formed according to the design rule.

Figure 1A:
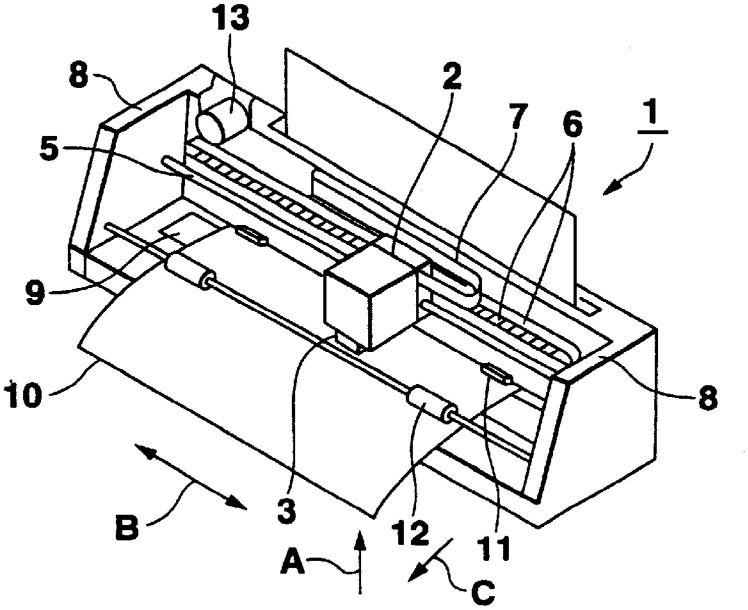
FIG.1A (PRIOR ART)
FIG. 1A is a general perspective view of a conventional thermal ink-jet printer head.
Figure 1B:
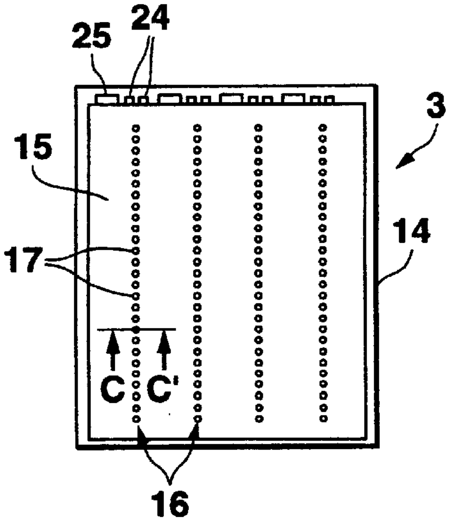
FIG.1B (PRIOR ART)
FIG. 1B is a plan view showing the printer head of the ink-jet printer head in FIG. 1A as seen from the ink ejecting side.
Figure 1C:
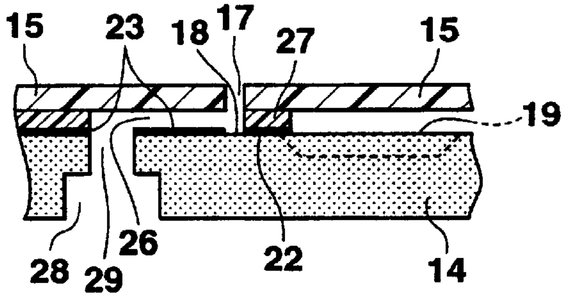
FIG.1C (PRIOR ART)
FIG. 1C is a cross-sectional view as seen from the direction of C–C' in FIG. 1B.
Figure 1D:
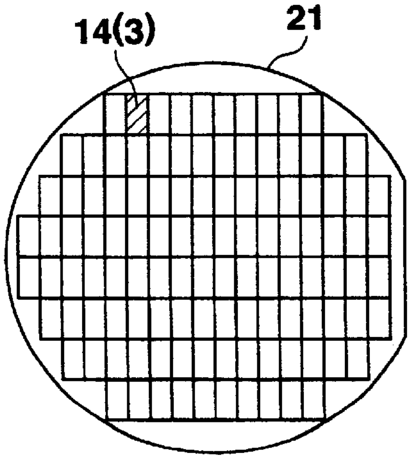
FIG.1D (PRIOR ART)
FIG. 1D is a plan view depicting a silicon wafer from which the printer head in FIG. 1B is manufactured.
Figure 2A:
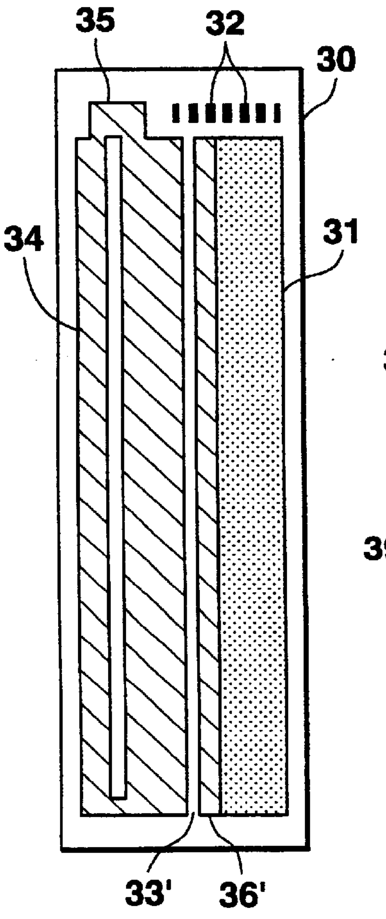
FIG. 2A is a plan view exemplarily illustrating the state after forming of heat generating elements is completed in the fabrication of an ink-jet printer head according to a first embodiment of this invention.
Figure 3A:
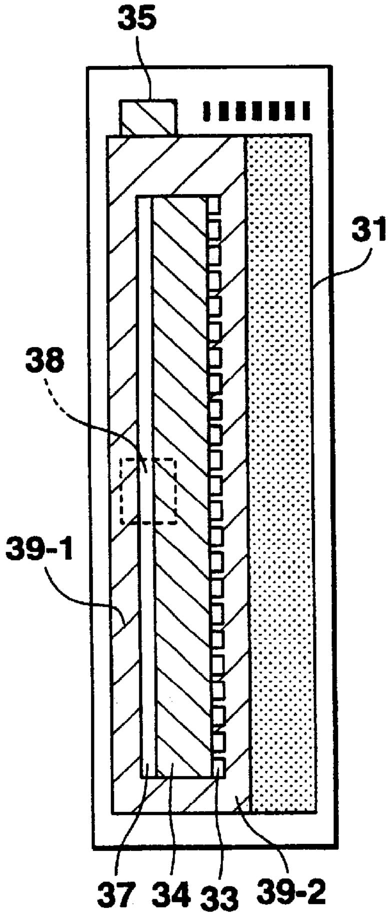
FIG. 3A is a plan view exemplarily showing the state after forming of a partition is completed in the fabrication of the ink-jet printer head according to the first embodiment of this invention.
Figure 4A:
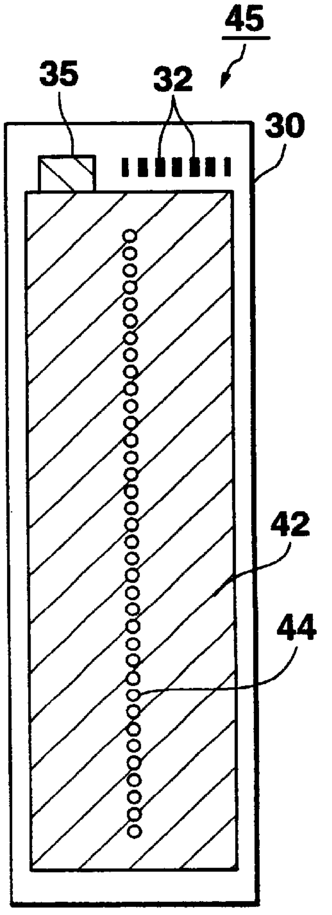
FIG. 4A is a plan view exemplarily showing the state after forming of orifices is finished in the fabrication of the ink-jet printer head according to the first embodiment of this invention.
Figures 5A, 5B, 5C, 6A, 6B, 6C, 7A, 7B, 7C:
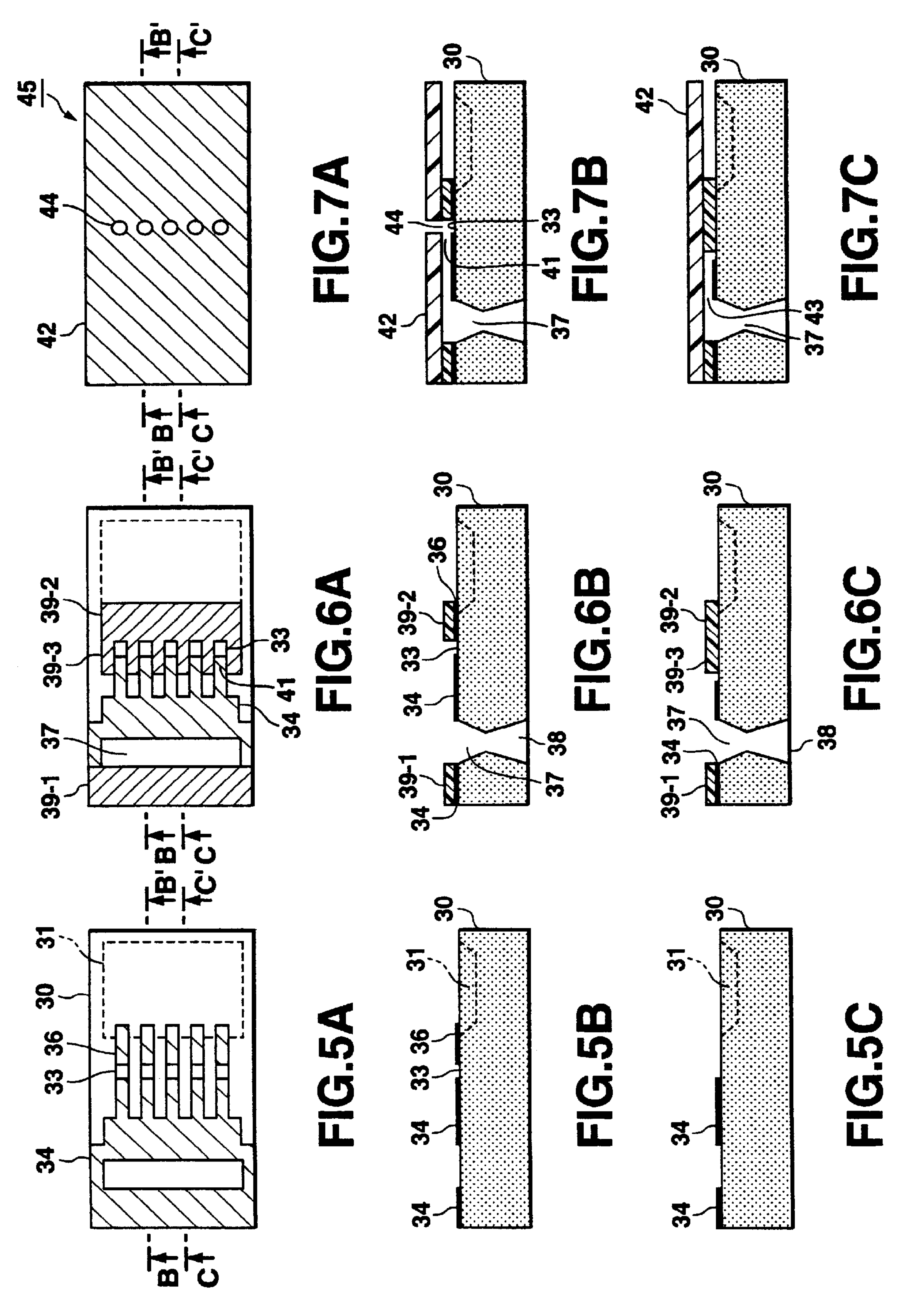
FIG. 5A is a plan view exemplarily showing a part f the structure in FIG. 2A in enlargement.
FIG. 5B is a cross-sectional view as seen from the direction of B–B' in FIG. 5A.
FIG. 5C a cross-sectional view as seen from the direction of C–C' in FIG. 5A.
FIG. 6A is a plan view exemplarily showing a part f the structure in FIG. 3A in enlargement.
FIG. 6B is a cross-sectional view as seen from the direction of B–B' in FIG. 6A.
FIG. 6C a cross-sectional view as seen from the direction of C–C' in FIG. 6A.
FIG. 7A is a plan view exemplarily depicting a part f the structure in FIG. 4A in enlargement.
FIG. 7B is a cross-sectional view as seen from the direction of B–B' in FIG. 7A.
FIG. 7C is a cross-sectional view as seen from the direction of C–C' in FIG. 7A.

FIGS. 5A, 6A and 7A are plan views exemplarily showing the essential portions, in partial enlargement, in the plan views of FIGS. 2A, 3A, 4A. FIGS. 5B, 6B and 7B are cross-sectional views as seen from the direction of B–B' in the first three diagrams, and FIGS. 5C, 6C and 7C are cross-sectional views as likewise seen from the direction of C–C' in the first three diagrams. FIGS. 5A–7C show five heat generating sections 33, five orifices 44 and the like as a representative of 64, 128 or 256 heat generating sections, orifices and the like for the sake of illustrative convenience.

The basic manufacturing method will be discussed below. First, as step 1, drivers and their leads are formed on a silicon substrate of 4 inches or larger by LSI technology and an oxide film ($SiO_2$) having a thickness of 1 to 2 μm is formed thereon. As the next step 2, a film of a heat-generating resistor of tantalum (Ta)-silicon (Si)-oxygen (O) is formed by using thin film deposition technology, and an electrode film of Au or the like is sequentially deposited on this heat-generating resistor element film with a close barrier layer of Ti—W or the like intervened. Then, the electrode film and the heat-generating resistor element film are patterned by photolithography technology. Then heat generating sections are acquired by exposing the heat-generating resistor element and wiring electrodes are laminated on both side of the heat generating section, thereby obtaining, for example, 128 heat generating element of a stripe shape. In this step, the positions of the heat generating sections are aligned.

FIGS. 2A, 2B and 5A–5C show the state immediately after the steps 1 and 2 have been completed. On a chip substrate 30, drivers 31 and driver leads 32 (see FIG. 2A) are formed under an insulating layer which is formed by an oxide film. On the insulating layer, the heat-generating resistor element film is patterned into a plurality of columns of heat generating sections 33 with a common electrode 34 and an individual wiring electrode 36 formed on the respective sides of each heat generating section 33. That is, plural columns of heat generating elements each comprised of the common electrode 34, the heat generating section 33 and the individual wiring electrode 36 are formed in parallel at predetermined intervals, thereby yielding heat generating section columns 33' and individual wiring electrode columns 36'. Common-electrode power-supply leads 35 are formed together with the common electrode 34 (see FIG. 2A).

As the next step 3, a partition member of an organic material such as photosensitive polyimide is formed to the thickness of about 20 μm by coating in order to form ink flow passages corresponding to the individual heat generating sections 33 and ink flow passages which are respectively connected to those ink flow passages. After patterning this partition member by photolithography, curing (annealing) is performed to apply heat of 300° C. to 400° C. to the chip substrate 30 for 30 to 60 minutes, thereby fixing the partition of photosensitive polyimide having a height of about 10 μm on the chip substrate 30. As the subsequent step 4, a common ink feed groove is formed in the surface of the chip substrate 30 where the partition is provided, by wet etching, sand blasting or the like, followed by the forming of an ink feed hole which communicates with this ink feed groove and is open to the bottom of the chip substrate 30.

FIGS. 3A, 3B and 6A–6C show the state immediately after the steps 3 and 4 have been completed. A common ink feed groove 37 and ink feed hole 38 are formed in such a way as to be surrounded by the common electrode 34. An ink seal partition 39-1 is formed on that port of the common electrode 34 which lies on the left-hand side of the common ink feed groove 37, and an ink seal partition 39-2 is formed on that port of the common electrode 34 which lies on the right-hand side where the individual wiring electrode 36 is laid. A segmenting partition 39-3 extends from this ink seal partition 39-2 to between the individual heat generating sections 33.

Considering the ink seal partition 39-2 on the individual wiring electrodes 36 as the spine of a comb, the segmenting partition 39-3 that extends to between the individual heat generating sections 34 has a shape equivalent to the teeth of the comb. With the teeth-like segmenting partition 39-3 serving as partition walls, ultra fine ink flow passages 41 formed with the heat generating sections 33 located at the bases between the teeth are equal in number to the heat generating sections 33.

Next, as step 5, an orifice plate which has a shape of a thin film sheet of polyimide with a thickness of 10 to 30 μm is adhered on the topmost layer of the lamination structure or the partition 39 (39-1, 39-2, 39-3) via, for example, a thermoplastic adhesive, and pressure is then applied to the resultant structure while heating it at 290 to 300° C., thereby fixing the orifice plate. Subsequently, a metal film of Ni, Cu, Al or the like having a thickness of 0.6 to 1 μm is deposited on the surface of the orifice plate which is opposite to the side where the partition is secured (the side where the metal film is deposited will hereinafter be called the opposite-to-partition side). This metal film serves as a mask at the time the orifices to be discussed later are bored through by dry etching.

Then, as step 6, the metal film on the orifice plate is patterned to form a mask for selective dry etching of the orifice plate, followed by dry etching of the orifice plate according to the metal mask using the helicon-wave dry etching system to be specifically discussed later, thereby ensuring simultaneous forming of multiple orifices of 31 μm ϕ to 15 μm ϕ.

FIGS. 4A, 4B and 7A–7C show the state immediately after the steps 5 and 6 have been completed. The orifice plate 42 covers the entire area excluding the common-electrode power-supply leads 35 and the driver leads 32, and the individual ink flow passages 41 having a height of 10 μm formed by the segmenting partition 39-3 have their openings facing toward the common ink feed groove 37. A common ink flow passage 43 having a height of 10 μm is formed to connect the openings of those ink flow passages 41 to the common ink feed groove 37.

The orifices 44 are formed in the orifice plate 42 at portions facing the heat generating sections 33. This completes a mono-color ink-jet printer head 45 that has a column of 64, 128 or 256 orifices 44.

As described above, the mono-color ink-jet printer head 45 equipped with a single column of orifices 44 takes the structure of a monochromatic ink-jet printer head, and needs a total of four color inks, namely a black (Bk) exclusively used for black portions of characters or images in addition to the subtractive primaries of yellow (Y), magenta (M) and cyan (C) in normal full-color printing. Therefore, a minimum of four columns of orifices are required.

Figure 8A:
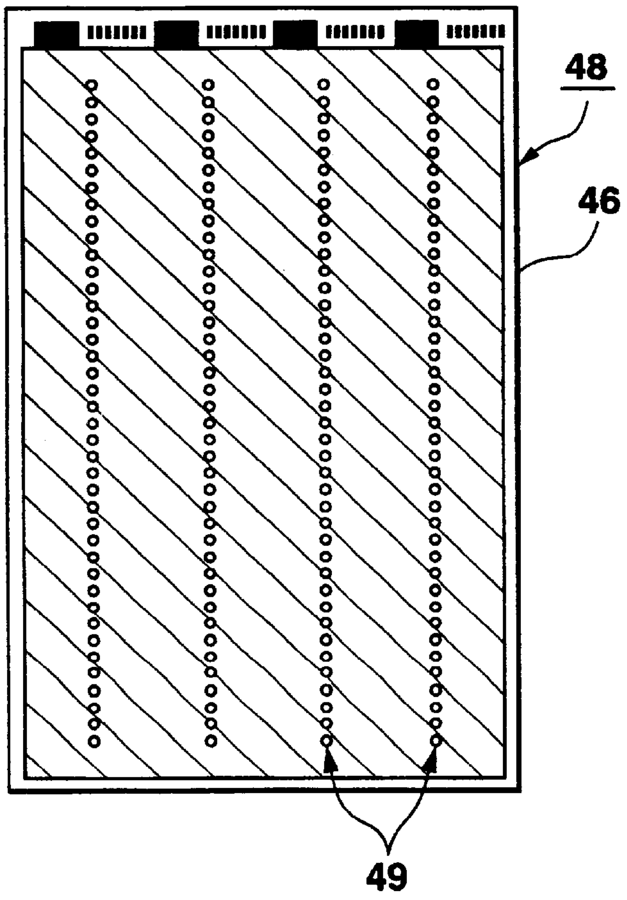
FIG. 8A is a plan view showing a full-color ink-jet printer head according to the first embodiment of this invention as seen from the ink ejecting side.
Figure 8B:
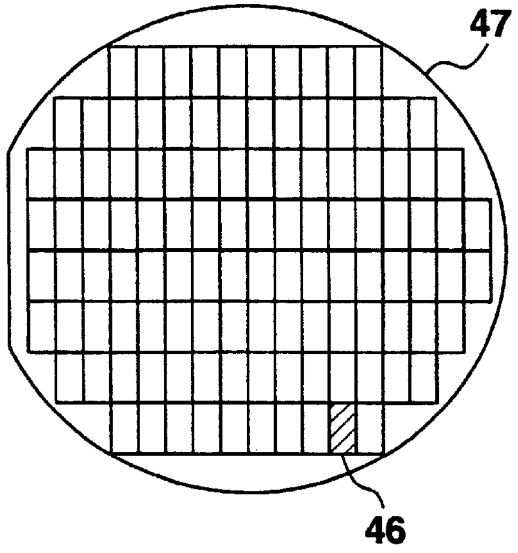
FIG. 8B is a plan view depicting a silicon wafer for producing the head in FIG. 8A.

FIG. 8A is a diagram showing a full-color ink-jet printer head constructed by arranging four mono-color ink-jet printer heads 45 of the above type side by side, and FIG. 8B is a view depicting multiple fill-color ink-jet printer heads 45 on a silicon wafer. The above-described method can manufacture a full-color ink-jet printer head 48 as shown in FIG. 8A by forming multiple chip substrates 46 each shown in FIG. 8A on a silicon wafer 47 as shown in FIG. 8B, and constructing the mono-color ink-jet printer heads 45 shown in FIGS. 4A and 4B on each chip substrate 46 in four columns in a monolithic form. The individual orifice columns 49 can be arranged accurately at the specific relation by the state-of-the-art semiconductor technology.

After the ink-jet printer heads are processed on the silicon wafer 47 in the above-described manufacturing steps, the silicon wafer 47 is finally diced along the scribe lines using a dicing saw or the like, separating the individual chip substrates 46 from one another, thus yielding the full-color ink-jet printer head 48 as shown in FIG. 8A. The acquired full-color ink-jet printer head 48 is then die-spotted to a mount substrate with its leads connected to those of the substrate, so that it becomes a practical unit of full-color ink-jet printer head.

The following will more specifically described how to bore the orifices using the helicon-wave dry etching system which has already been explained schematically in the section of the step 6 of the method of manufacturing the ink-jet printer head. The helicon-wave dry etching system is used in this embodiment because this etching system can conduct fast dry etching using a high-energy plasma current, which improves the working efficient. The helicon wave, which is one type of electromagnetic waves that propagate in plasma, is called a whistler wave and generates high-density plasma.

Figure 9A:
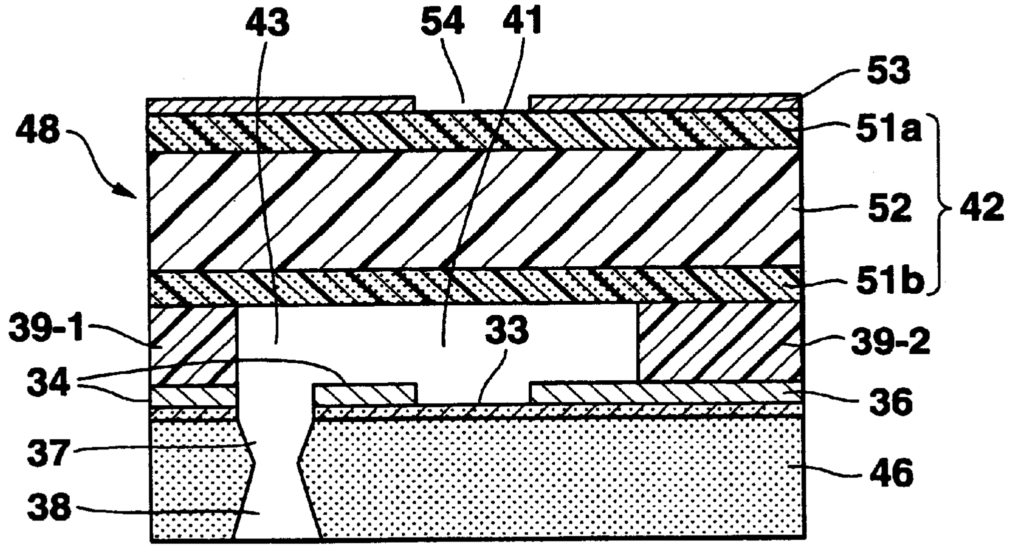
FIG. 9A is a cross-sectional view exemplarily showing the state in the vicinity of the heat generating sections before forming of the orifices has started.
Figure 9B:
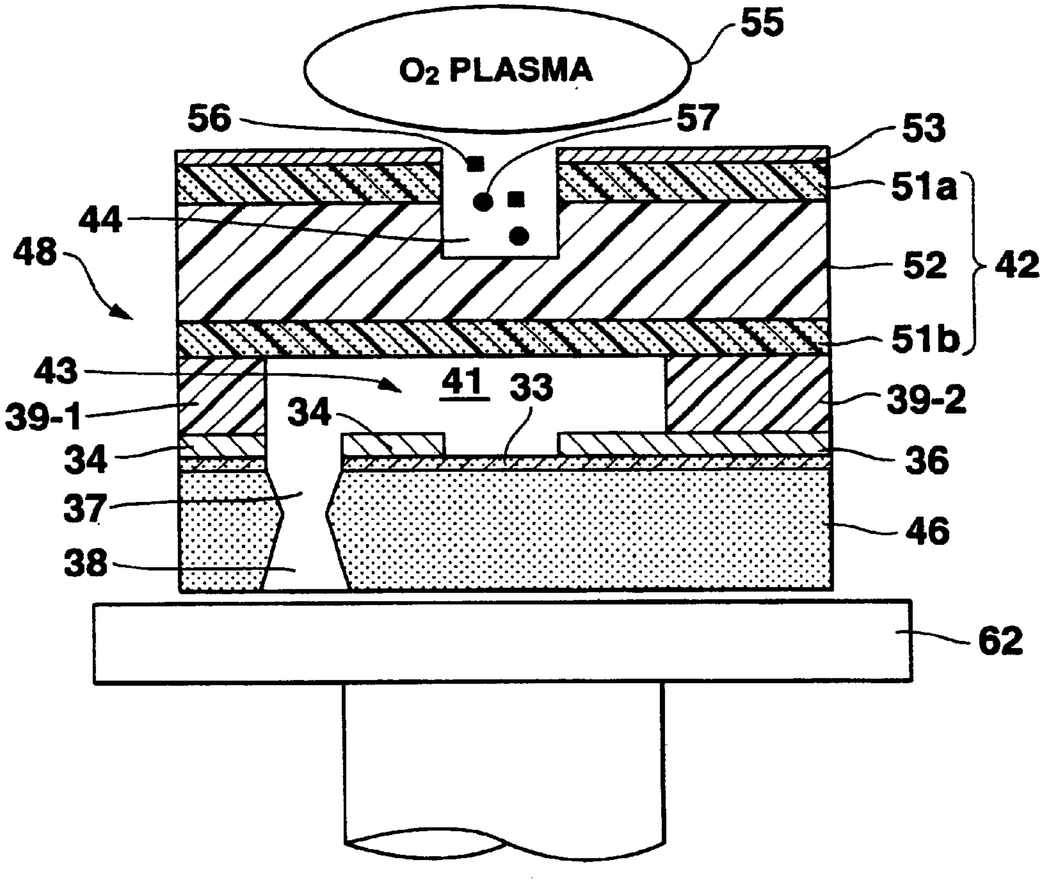
FIG. 9B is a cross-sectional view exemplarily showing the state in the vicinity of the heat generating sections after forming of the orifices has started.

FIG. 9A is a cross-sectional view exemplarily showing, in enlargement, the heat generating section 33 or the essential portion of the ink-jet printer head 48 under fabrication after a step before the above-described dry etching step, and a portion in the vicinity of that section 33. FIG. 9B is a cross-sectional view showing the state in which the ink-jet printer head 48 is subjected to dry etching by the helicon-wave dry etching systems.

As shown in FIG. 9A, the orifice plate 42 comprises three layers: an adhesive layer 51*a*, a polyimide film 52 and an adhesive layer 51*b*. The adhesive layers 51*a* and 51*b* are formed of, for example, thermoplastic polyimide or epoxy-based adhesives and are coated on the top and bottom surfaces of the polyimide film 52 having a thickness of about 30 $\mu$m to the thickness of about 2 to 5 $\mu$m. When the temperature rises above the glass transition point, the elastic modulus of a thermoplastic resin material, such as the adhesive layer 51*a* or 51*b*, drops sharply, thus increasing the stickiness so that this material demonstrates the adhesive effect.

However, this property is required on the back side of the orifice plate 42 that is to be adhered to the partition 39 (39-1, 39-2, 39-3), not on the top side or the ejection side of the orifice plate 42. The adhesive layer 51*a* is provided on the top surface in addition to the adhesive layer 51*b* on the back side of the orifice plate. Because the orifice plate with the adhesive layer 51*b* on the back side alone would cause warp or curl of the orifice plate member during the fabrication process and it makes the work difficult. In other words, providing both the top and back sides of the orifice plate 42 with the same thermal expansion characteristic by the adhesive layers 51*a* and 51*b* prevents the polyimide film 52 from being rolled up during the fabrication process.

This orifice plate 42 is placed on the partition 39 with that side of the adhesive layer 51*b* facing the chip substrate 46, thereby forming a cover to the individual ink flow passages 41 and common ink flow passage 43. As the orifice plate 42 is heated to 200 to 250° C. and applied with pressure of several Kg/cm$^2$ for several tens of minutes, it is uniformly and securely adhered to the partition 39.

Subsequently, a metal film 53 of Ni Cu, Al, Ti or the like is formed to the thickness of about 0.5 to 1 $\mu$m as a mask material for dry etching to be discussed later, and a pattern 54 corresponding to the orifices 44 shown in, for example, FIG. 4A is formed on that film, thereby forming a mask for selective etching of the orifice plate 42. In a case where the helicon-wave dry etching system is used to bore the orifices 44 in the orifice plate 42 as in this example, the use of the metal film 53 of Ni, Cu, Al, Ti or the like provides the etching rate ratio of approximately 1:50 to 100 for the polyimide film 52 to the metal film 53. To etch the polyimide film 52 of approximately 30 $\mu$m, therefore, the metal film 53 of less than 1 $\mu$m suffices.

After the forming of the metal film 53, the chip substrate 46 or the silicon wafer 47 shown in FIG. 8B is placed in the helicon-wave dry etching system and the orifices 44 are bored by dry etching as shown in FIG 9B. Oxygen is used as the process gas for dry etching in the helicon-wave dry etching system. In the helicon-wave dry etching system, the process oxygen $O_2$ becomes oxygen plasma 55 consisting of oxygen ions 56 and oxygen radical atoms 57, which is sprayed onto the metal mask surface, thereby boring the orifices 44 according to the pattern 54, as shown in FIG. 9B.

The adhesive layer 51*a* on the top of the orifice plate 42 does not raise a big problem in the forming of holes by an ordinary dry etching system or the forming of holes by excimer laser or the like. When a helicon-wave dry etching system is used to form holes faster as in this invention, however, the helicon-wave dry etching uses the high-energy ion current and thus significantly raises the temperature of the target work piece than other etching schemes. This brings about the following problem.

Figure 10:
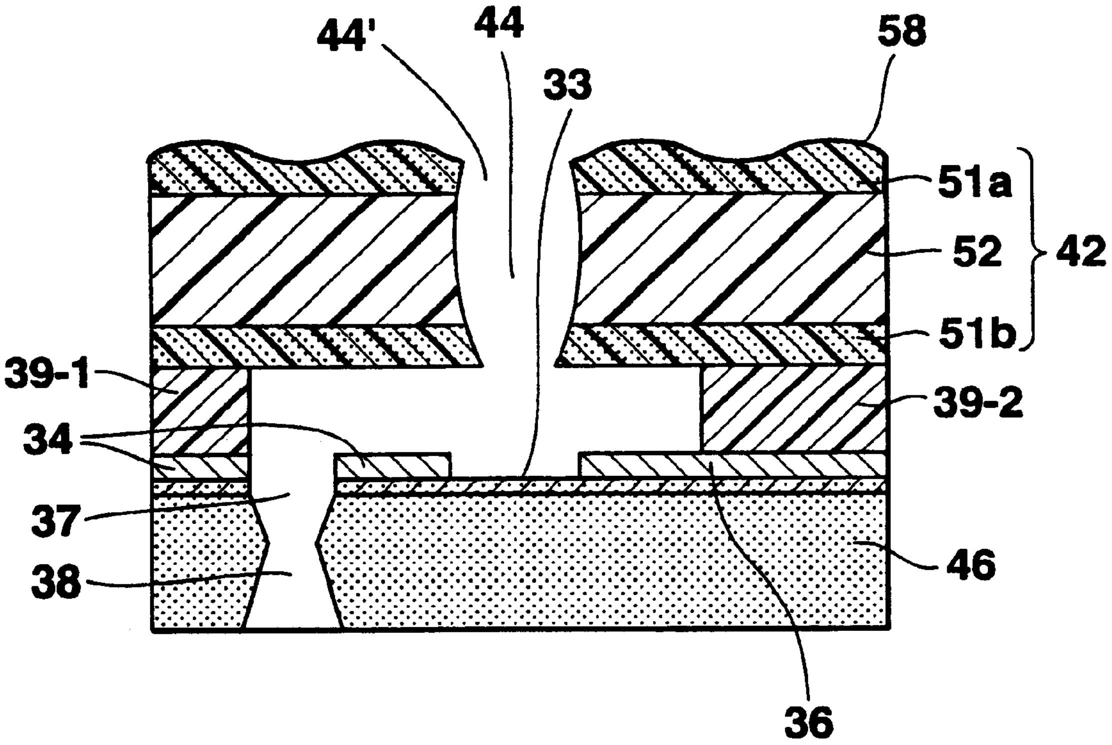
FIG. 10 is a cross-sectional view exemplarily showing a problem which arises when the orifices are bored by helicon-wave dry etching.

FIG. 10 is a cross-sectional view exemplarily showing the problem which arises when the orifices are bored by a helicon-wave dry etching system. When the orifices are bored in the normal manner using the helicon-wave dry etching system, as shown in FIG. 10, the entire target work piece or the entire printer head substrate that is the chip substrate 46 on which the heat generating sections 33, the partition 39 and the orifice plate 42 are provided is heated to a high temperature. The thermoplastic adhesive layer 51*a* on the surface of the orifice plate 42 which is influenced most by the oxygen plasma is thermally expanded most, generating wrinkles 58 on the thermoplastic adhesive layer 51*a*. As a result, the greatly expanded adhesive layer 51*a* may remain as an etching residual in the orifices 44 or the shape of ejection ports 44' may be finished deformed. This undesirably causes the ink to be ejected in a direction not originally intended, i.e., in a direction different from the perpendicular direction to the surface of the orifice plate or causes very small undesirable dots called satellites to be hit around the struck dots.

To prevent the production of the wrinkles 58, an orifice plate having no adhesive layer 51*a* on the top side may be used, but this scheme is not recommendable because as mentioned earlier the adhesive layer 51*a* on the top side serves to prevent curling of the orifice plate 42 during the fabrication process.

In this embodiment, therefore, attention is paid to the fact that the glass transition point Tg of thermoplastic polyimide which is used as the adhesive layer 51*a* is greater than 200° C., etching is performed while cooling the silicon wafer 47 to or lower than 200° C. in the forming of the orifices 44 in the orifice plate 42 by a helicon-wave dry etching system.

Figure 11B:
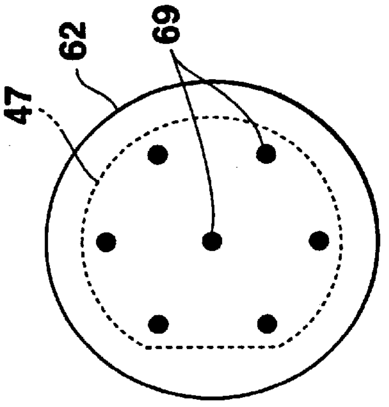
FIG. 11B is a plan view showing a wafer chuck stage in the helicon-wave dry etching system in FIG. 11A.
Figure 11C:
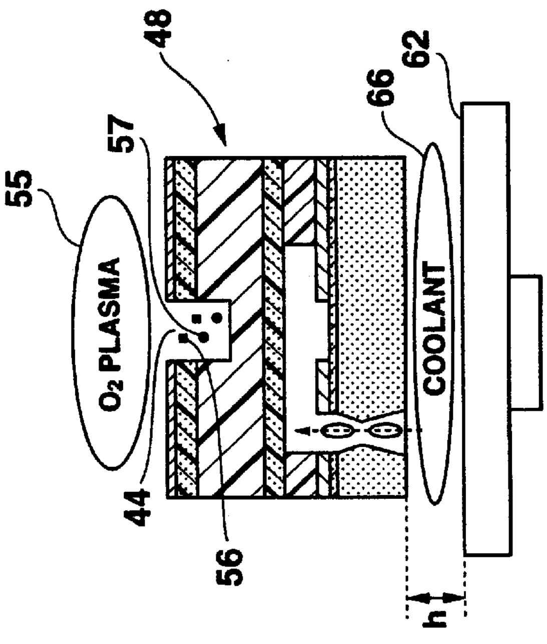
FIG. 11C is a cross-sectional view exemplarily illustrating a printer head substrate which is being processed by the helicon-wave dry etching system in FIG. 11A.
Figure 11A:
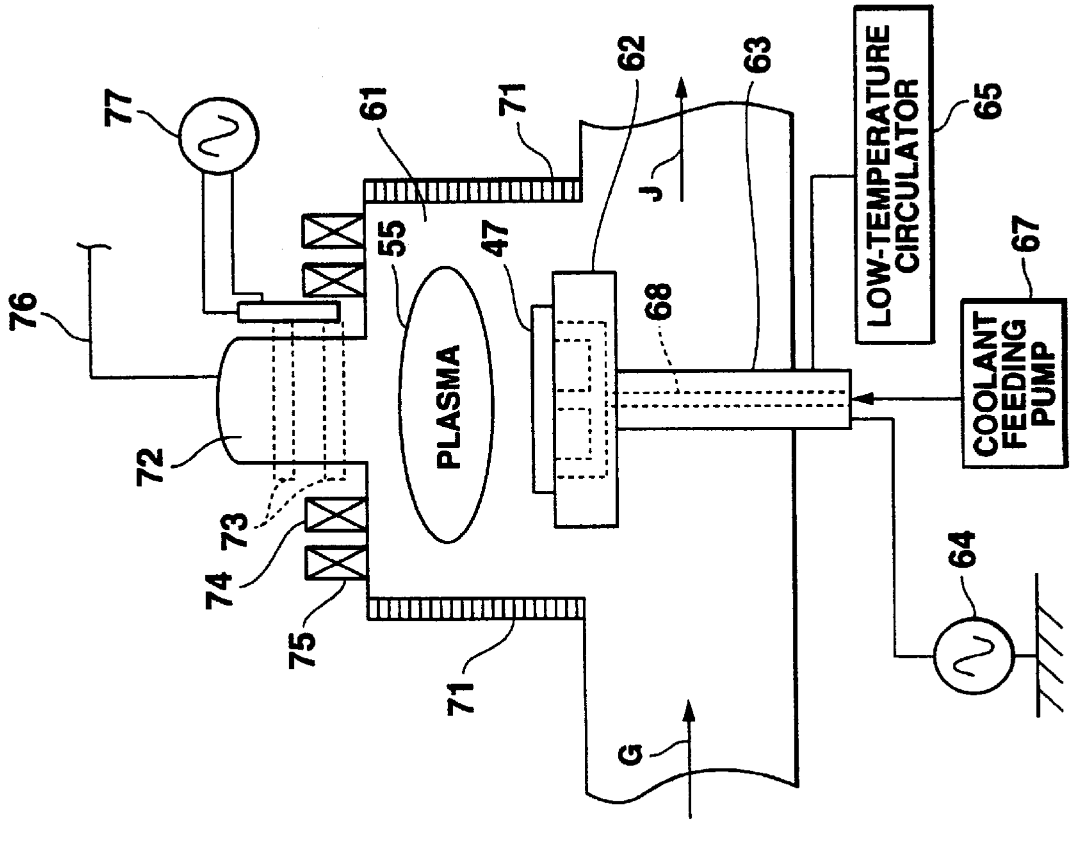
FIG. 11A is an exemplary explanatory diagram illustrating the schematic structure of a helicon-wave dry etching system.

FIG. 11A is an exemplary explanatory diagram illustrating a helicon-wave dry etching system, FIG. 11B is a plan view of its wafer chuck stage, and FIG. 11C is a partially enlarged view of FIG. 11A. As shown in FIG. 11A, helicon-wave dry etching system has a process chamber 61 at the center and a wafer chuck stage 62 provided in this process chamber 61. The silicon wafer 47 shown in FIG. 8B is loaded into the system from the left to the system as indicated by an arrow G in FIG. 11A and placed on the wafer chuck stage 62.

The silicon wafer 47 is secured on the wafer chuck stage 62 by mechanical chucking (which mechanical holds the target), electrostatic chucking (which electrostatically holds the target) or the like. The wafer chuck stage 62 is formed integrally on a support 63 via which an RF (Radio-Frequency) bias of, for example, 13.56 MHz is applied to the stage 62 from a ground-side AC power supply 64.

An antifreezing liquid from a low-temperature circulator 65 circulates to the wafer chuck stage 62 via the support 63. A coolant gas 66 such as He gas for progressing thermal conduction and enhancing the cooling effect is fed into coolant ejection ports 69 open to the wafer support surface of the wafer chuck stage 62 from a coolant feeding pump 67 via a coolant feeding passage 68 provided in the support 63 and the wafer chuck stage 62, entering into a small clearance h between the wafer chuck stage 62 and the silicon wafer 47. This progresses the cooling of the silicon wafer 47 by the low-temperature circulator 65.

Specifically, the wafer chuck stage 62 of the helicon-wave dry etching system is cooled down to −10° C. or lower with the circulating antifreezing and the coolant gas 66 intervenes between the wafer chuck stage 62 and the silicon wafer 47, thereby effectively suppressing a rise in the temperature of the entire printer head substrate at the time of helicon-wave dry etching.

Arranged around the process chamber 61 is a magnet 71 for trapping the oxygen ($O_2$) plasma 55 in the chamber 61 and a source chamber 72 is located in the upper center of the chamber 61. An antenna 73 is provided in two (upper and lower) stages around the source chamber 72 and an inner coil 74 and outer coil 75 are disposed outside the antenna 73 to seal the plasma.

Open to the upper portion of the source chamber 72 is a pipeline 76 from which the process gas (process oxygen) is supplied. A source power supply 77 applies a voltage of 13.5 MHz corresponding to the cycle of the ground side AC power supply 64 to the two-stage antenna 73.

With this structure, the process oxygen supplied through the pipeline 76 is turned into plasma in the source chamber 72 by the antenna 73 and is then sent into the process chamber 61 by the inner coil 74 and outer coil 75. The oxygen plasma 55 that has been generated in this manner is sucked and accelerated in the process chamber 61 by the RF bias voltage which is applied to the silicon wafer 47 (hereinafter called "printer head substrate" though the substrate is actually processed in the form of the silicon wafer 47) via the support 63 and wafer chuck stage 62.

The magnet 71 located on the wall of the process chamber 61 prevents the electrons of the oxygen plasma 55 from vanishing on the wall. This causes the oxygen plasma 55 to shower on the printer head substrate (silicon wafer 47) in a uniform distribution and collide on the top surface of the orifice plate 42 that is exposed by the mask pattern 54 on the metal film 53, thereby etching the orifice plate 42. The process gas after the treatment is discharged to the right of the system as indicated by an arrow J in FIG. 11A.

Although helicon-wave dry etching, unlike RIE (Reactive Ion Etching), does not have a parallel plate arrangement of electrodes, the potential of the printer head substrate 46 acts in the direction to pull in the oxygen ions 56 in the oxygen plasma 55. Accordingly, chemical etching is carried out using the radical atoms 57 at the same time the oxygen ions 56 are sputtered on a work piece (orifice plate 47).

When the work piece is polyimide, for instance, the essential substances are carbon and hydrogen, so that etching is performed with a chemical reaction of $CxHy+O \rightarrow CO_2\uparrow + H_2O\uparrow$. Therefore, the helicon-wave dry etching can carry out anisotropic etching, such as forming of holes, with a high etching rate ratio by using a combination of sputtering (physical etching) and radical reaction (chemical etching).

Although etching is carried out while the printer head substrate is sufficiently cooled, the above-described cooling system alone still brings about the problem illustrated in FIG. 10.

Figure 12:
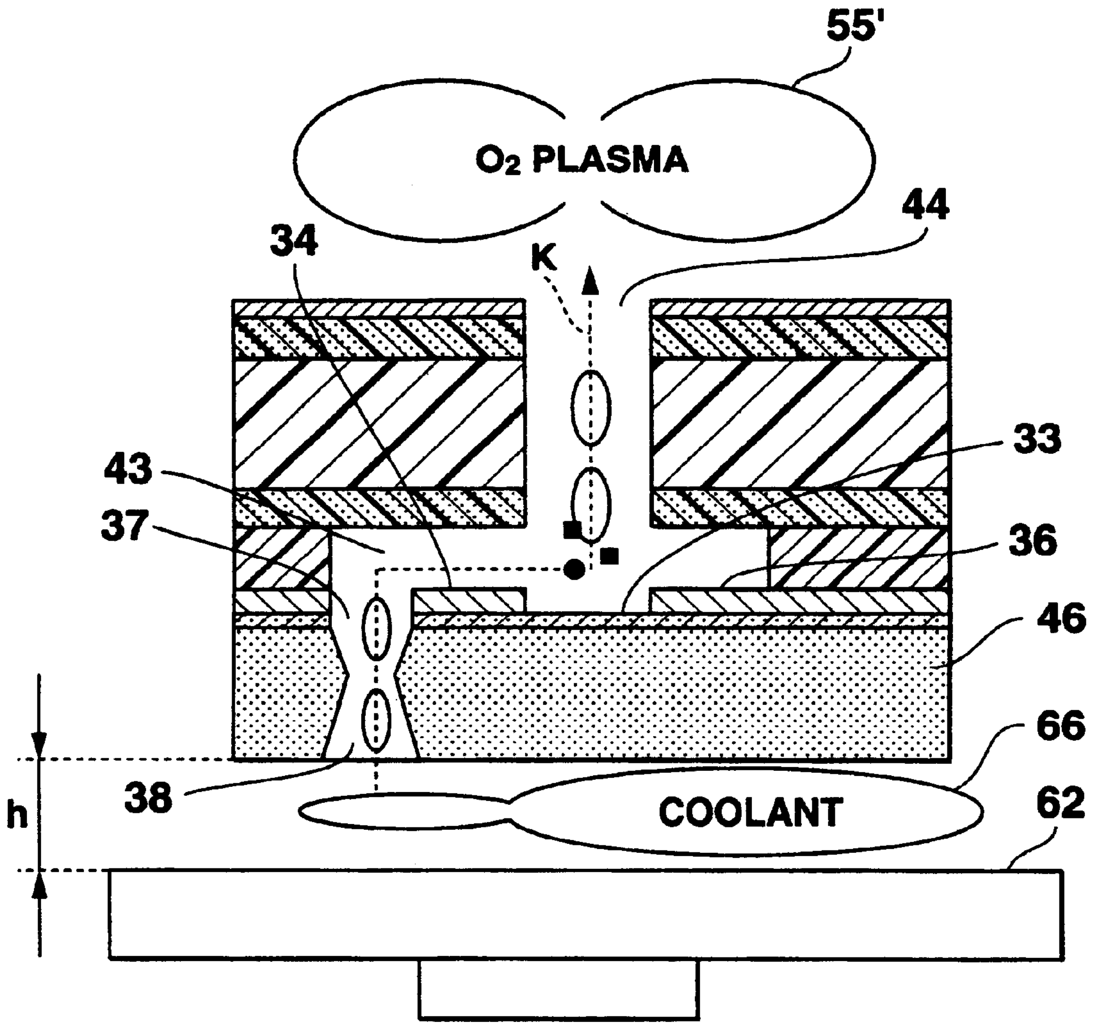
FIG. 12 is an exemplary cross-sectional view of the state where a coolant gas is blown out of the bored orifices.

FIG. 12 is a diagram for explaining the cause for the problem that still occurs even when etching is carried out while the printer head substrate is sufficiently cooled As illustrated in the diagram, because an ink feed hole 38 is open in the back of the chip substrate 46, the coolant gas 66 escapes upward from the orifices 44, passing through the ink feed hole 38, the common ink feed groove. 37 and the ink flow passages 43 as indicated by an arrow K from the instance the orifices 44 are bored through by the helicon-wave dry etching.

As a residual such as the adhesive layer 51*a* sticks on the walls of the orifices 44 when the orifices 44 are bored through by dry etching, over-etching is generally performed for about 1 to 3 minutes in order to remove the residual and finish the orifices into the desired and adequate shape. If the coolant gas 66 escapes upward from the orifices 44 at this time, however, the degree of vacuum in the clearance h between the wafer chuck stage 62 and the back of the chip substrate 46 increases and the thermal conductivity falls accordingly. This rapidly raises the temperature of the overall printer head substrate including the chip substrate 46.

As a result, the wrinkles 58 are produced on the surface of the orifice plate 42 as shown in FIG. 10. At this time, a large amount of the coolant gas 66 that comes out above the orifice plate 42 makes the density of the oxygen plasma 55' non-uniform. It was found out that such a non-uniform density might damage or deteriorate the MOS transistors and capacitors in the driver 31.

According to the first embodiment, the ink feed hole 38 is temporarily blocked to overcome the problem that the coolant gas 66 escapes above, passing the route from the ink feed hole 38 to the orifices 44 when the orifices 44 are bored through.

Figure 13A:
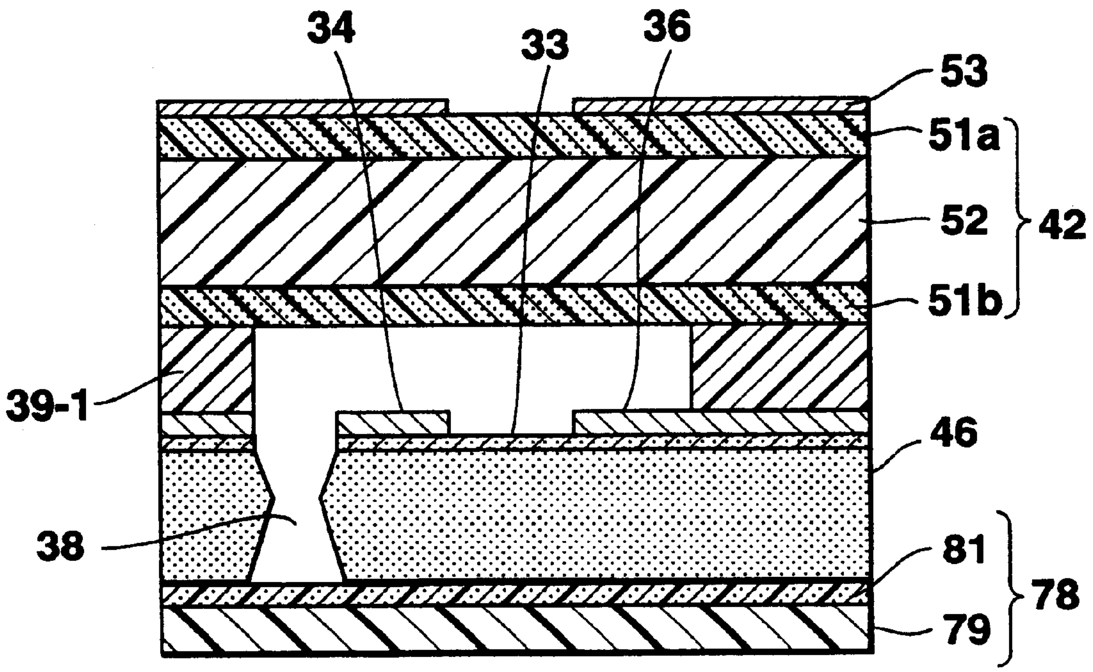
FIG. 13A is an exemplary cross-sectional view showing an ink feed hole being blocked in a manufacturing method according to the first embodiment of this invention.
Figure 13B:
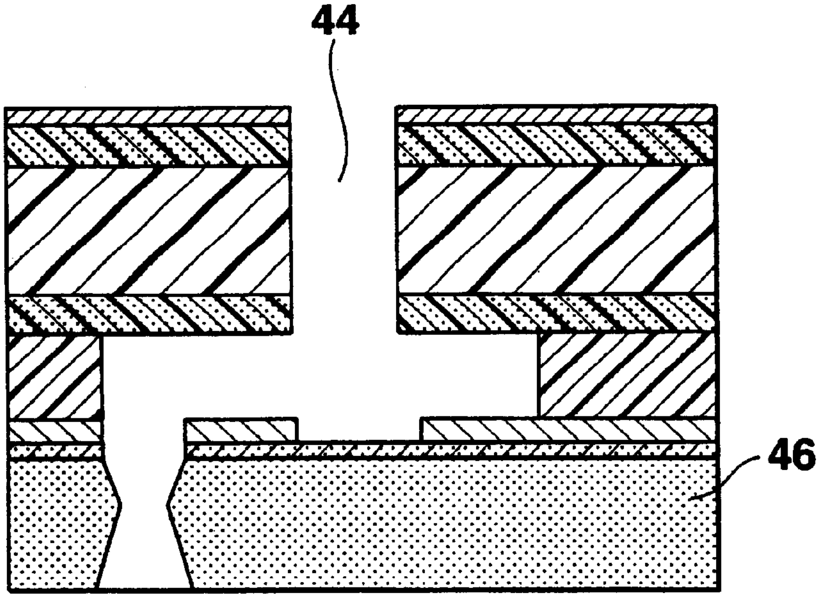
FIG. 13B is an exemplary cross-sectional view showing the ink-jet printer head acquired according to the first embodiment of this invention.

FIG. 13A is a diagram showing the ink feed hole 38 being temporarily blocked by adhering an adhesive-applied sheet 78 to the back of the chip substrate 46, and FIG. 13B is an enlarged cross-sectional view exemplarily showing the case where the orifices 44 are bored using this scheme.

The adhesive-applied sheet 78 shown in FIG. 13A has a two-layer structure which has a thermally separable adhesive 81 deposited on a base or polyester film 79. The thermally separable adhesive 81 has an adhesive strength at room temperature but is easily separable from the interface with the chip substrate 46 at above a certain temperature. This thermal separation temperature is over 90° C. for an a type, over 120° C. for a β type and over 150° C. for a γ type, for example.

FIG. 14 is a table showing the results of a test conducted on the adhesive strength of the thermally separable adhesive 81 using a PET (polyethyleneterephthalate) film as an adhesion target. As apparent from this table, the adhesive of the type β whose thermal separation temperate is 120° C. has an adhesive strength of 500 g/20 mm before separation, the strongest among the three types, while the coating thickness is thinner by 15 μm than the adhesive of the type γ whose thermal separation temperature is 150° C.

If air comes into the interface between the chip substrate 46 and the thermally separable adhesive 81, when the printer head substrate is loaded into the helicon-wave dry etching system, this air expands in the vacuum and lifts the chip substrate 46 above the wafer chuck stage 62. At the time of adhering the adhesive-applied sheet 78 to the chip substrate 46, therefore, the sheet 78 is closely adhered to the chip substrate 46 by using a tool such as a roller or a brush so that the air does not come into the interface.

As helicon-wave dry etching shown in FIG. 11A is executed this way, even after the orifices 44 are bored through, the uniform cooling state as obtained before the penetration of the orifices 44 can be maintained. This can ensure sufficient over-etching, so that the orifices of the desired and adequate shape can be formed as shown in FIG. 13B.

After the process of helicon-wave dry etching is completed, the printer head substrate adhered with the adhesive-applied sheet 78 is placed in an oven and is heated more than 3 minutes at 90° C., 120° C. or 150° C. according to the thermal separation temperature of each adhesive. Accordingly, the thermally separable adhesive 81 can easily be separated without remaining on the chip substrate 46 as shown in FIG. 13B.

The following are the suitable conditions in the process of boring the orifices 44 in the orifice plate 42 by helicon-wave dry etching while cooling the printer head substrate.

flow rate of the process gas (oxygen): 4–76 sccm process pressure: 0.2–1 Pa source power: 500–1000 W bias power: 50–600 W process time: 10–40 minutes temperature set for the circulator. −10 to −30° C.

flow rate of cooling He: 10–30 sccm etching rate of polyimide: about 1–3 μm/minute One example of the process conditions in the case where the ink feed hole is block with the adhesive-applied sheet 78 to which the thermally separable adhesive 81 having a thermal separation temperature of 90° C. is applied and the orifices 44 are bored through in the orifice plate 42 having a thickness of 16 μm by helicon-wave dry etching is given below.

thickness of the orifice plate: 16 μm degree of vacuum achieved: $7.45\times10^{-2}$ Pa flow rate of the process gas (oxygen): 50 sccm process pressure: 0.5 Pa source power: 1000 W bias power: 300 W process time: 13 minutes temperature set for the circulator: −30° C.

flow rate of cooling He: 10 sccm etching rate of polyimide: about 1.6 μm/minute

Under the above conditions, the etching time till the penetration of the orifices is 10 minutes and the over-etching time is 3 minutes. During the process, the adhesive strength of the adhesive-applied sheet 78 did not get lower and the expansion of the printer head substrate caused by blocking the ink feed hole 38 did not adversely affect the helicon-wave dry etching.

The means for temporary blocking of the ink feed hole 38 in the chip substrate 46 is not limited to the use of the adhesive-applied sheet 78, but a dry film, for example, may be used as well.

Figure 15:
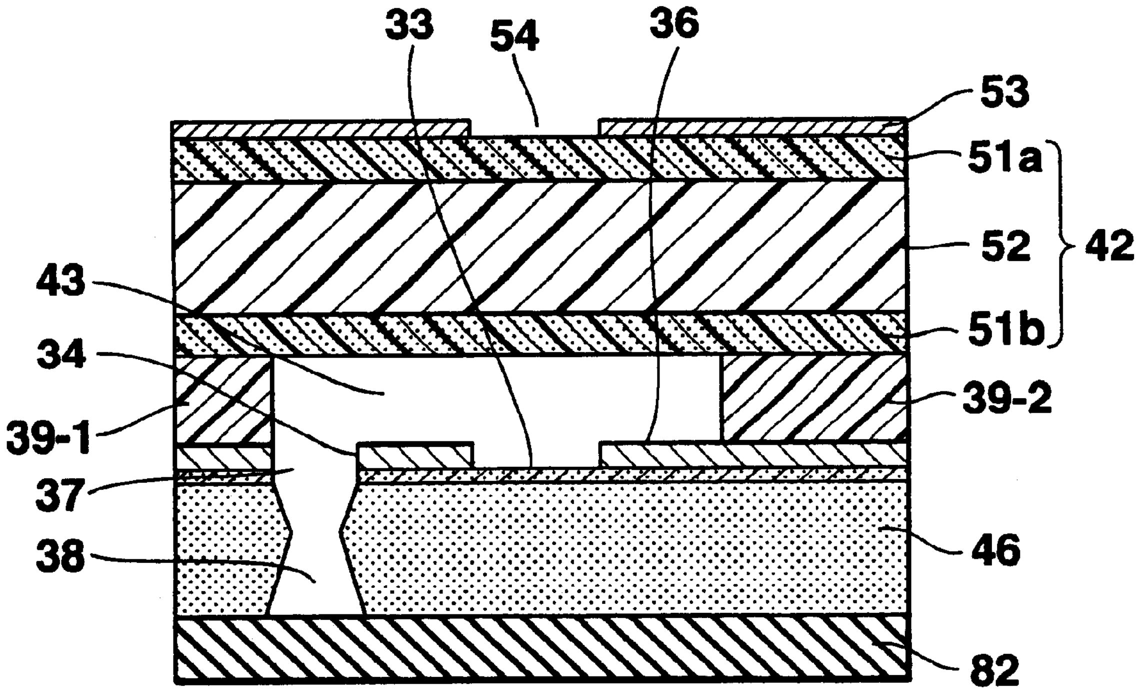
FIG. 15 is a cross-sectional view exemplarily showing a modification of the first embodiment of this invention.

FIG. 15 is a diagram exemplifying a dry film 82 laminated on the back of the chip substrate 46 at 80 to 90° C. Even the use of the dry film 82 can block the ink feed hole 38. In this case, the dry film 82 should be peeled off by using a peeling solution of, for example, monoethanolamine after the process of boring the orifices by helicon-wave dry etching is completed.

A second embodiment of this invention will now be discussed.

Figure 2B:
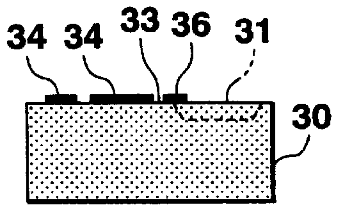
FIG. 2B is a cross-sectional view of this state.
Figure 3B:
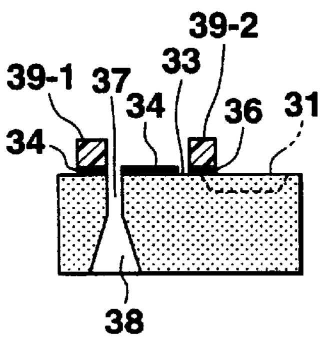
FIG. 3B is a cross-sectional view of this state.
Figure 4B:
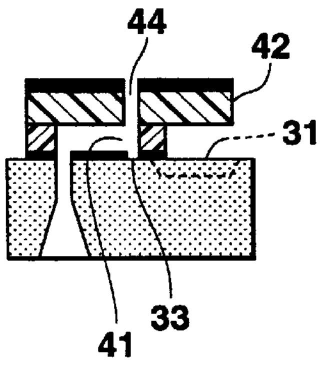
FIG. 4B is a cross-sectional view of this state.
Figures 16A, 16B, 16C, 16D, 16E, 16F:
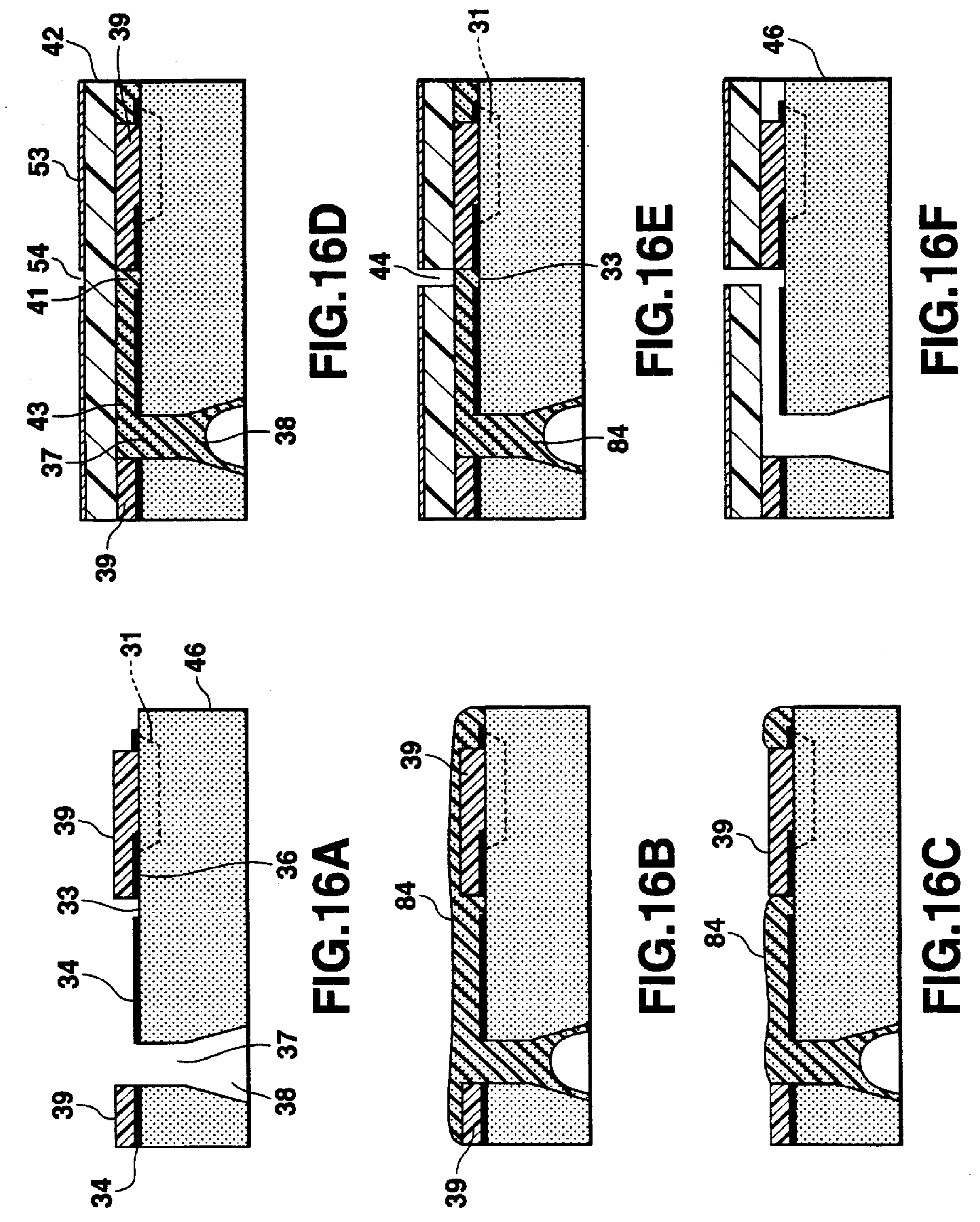
FIGS. 16A through 16F are exemplary cross-sectional views showing a method of manufacturing an ink-jet printer head according to a second embodiment of this invention step by step for each of the essential stages.

FIGS. 16A through 16F are exemplary diagrams showing a method of manufacturing an ink-jet printer head according to the second embodiment of this invention. FIG. 16A shows the state of the printer head substrate immediately after the above-described fabrication steps 1 to 4 are completed or the same state as shown in FIG. 2B, so that same reference numerals are given to those components which are the same as the corresponding components shown in FIG. 2B.

This embodiment differs from the first embodiment in the process after the state in FIG. 16B. First, as shown in FIG. 16B, a water soluble resin material such as PVA (polyvinyl alcohol) is coated as a protection film 84 on the surface side of the chip substrate 46 where the partition 39, etc. are formed. The ink feed passage that connects the ink feed hole 38 to the common ink feed groove 37 penetrates from the bottom to the top of the chip substrate 46. It is therefore preferable that a flow preventing film (not shown) or the like should be adhered to the back of the chip substrate 46 to prevent the protection film 84 from coming around to the back of the chip substrate 46 when the protection film 84 comes into the ink feed hole 38 from the common ink feed groove 37.

As the protection film 84 should easily be removed from the chip substrate 46 later, it is formed of, for example, a water soluble resin, such as PVA, polyvinylether or polyethylene oxide, a resin soluble to an acidic solvent, such as nylon, urea resin, glyptal resin or cellulose resin, or a resin soluble to an alkaline solvent, such as polyester, urea resin or melamine resin, or a resin soluble to other types of solvents, such as acetone, benzene, ethanol and chloroform.

The protection film 84 can be coated by various methods, such as spin coating, roll coating, spray coating, printing, potting and molding.

Because the protection film 84 coated on the partition 39 shown in FIG. 16B interferes with the later adhesion of the orifice plate 42, it is removed as shown in FIG. 16C by scraping, scratching or any other adequate scheme. The resultant structure is thereafter dried to harden the remaining protection film 84. Further, the flow preventing film which has become unnecessary is separated. Next, the orifice plate 42 is thermally adhered to the partition 39 by an unillustrated adhesive layer as in the ordinary fabrication procedures, and the metal film 53 is then formed, followed by the forming of the pattern 54, as shown in FIG. 16D. By the time this step is completed, the ink feed passages which extend from the ink feed hole 38 to the individual ink flow passages 41 through the common ink feed groove 37 and the common ink flow passage 43 has surely been blocked.

Subsequently, the orifices 44, the connection lead portions and the like are bored through by helicon-wave dry etching as shown in FIG. 16E. In this case too, over-etching is carried out for the proper period of time even after the penetration of the holes such as the orifices. It is the surface of the protection film 84 that undergoes over-etching, and none of the heat generating sections 33, the electrode portions and the drivers 31 under the protection film 84 are directly subjected to etching. Therefore, the heat generating sections 33 and the drivers 31 are not damaged by over-etching.

Because the ejection of the coolant gas at the time the orifices are bored through by helicon-wave dry etching which has been explained in the section of the first embodiment is inhibited by the protection film 84 that blocks the ink flow passages, cooling of the chip substrate 46 is maintained after the penetration of the orifices. This can overcome a possible failure in the drivers caused by the ejection of the coolant gas as well as can permit sufficient over-etching.

Thereafter, the protection film 84 that has become unnecessary is removed from the printer head substrate as shown in FIG. 16F by, for example, washing with warm water if it is soluble to water. When a resin material other than a water soluble one is used for the protection film 84, the protection film 84 is dissolved by an acidic or alkaline solvent to which the protection film 84 is soluble. In the process of removing the protection film 84, the residual that stays on the surface of the protection film 84 as a result of dry etching can be removed together.

In the above-described helicon-wave dry etching, oxygen plasma is used. This oxygen plasma has a higher etching effect on organics rather than on inorganics or metals. In this embodiment, therefore, a resin material which contains metal or inorganics with high etching resistance, when used for the protection film 84, demonstrates a better function as the protection film than a resin material alone. Specifically, it is better to use a material which has alumina, ceramics such as silicon nitride or glass particles contained in a resin material such as PVA, or a material which has metal, such as Al, Ni, Cu, Fe, Co or Ag, contained in a resin material for the protection film 84.

For the protection film 84, a polysilicatevinyl-based photoresist, a rubber-based negative (cyclopolyisoprene bisazido based) photoresist, a positive photoresist of a novolak resin or a photoresist of an azido compound may be used instead of the aforementioned resins or resin materials containing metal or inorganics.

In this case, after the protection film 84 is coated on the chip substrate 46, exposure and development are performed for patterning in such a way that the protection film 84 remains at the other portions than on the partition, then the resultant structure is baked to cure the protection film 84. Then, after the orifice plate 42 is adhered to the protection film 84, the metal film mask 53 is formed and the orifices 44 are bored through by dry etching, the protection film 84 that has become unnecessary should be removed from the printer head substrate as shown in FIG. 16F by, for example, washing with warm water if it is soluble to water. When a resin material other than a water soluble one is used for the protection film 84, the protection film 84 is dissolved by an alkaline stripping agent, solvent or the like.

As the protection film 84 has a photosensitive property, this scheme can allow a fine pattern to be formed by using photolithography and is therefore advantageous in that miniaturization processing which matches with the miniaturization of ink-jet printer heads is possible. In place of a liquid photoresist material, a dry film resist material may be used. In this case, the dry film resist material is adhered by heating and pressurization applied by a heating roller. Because the dry film resist material does not have a flowability as compared with a liquid resist material, it is unnecessary to adhere a flow preventing film to the back of the silicon wafer 47. This can contribute to simplification of the fabrication steps.

A third embodiment of this invention will now be discussed.

Figure 17A:
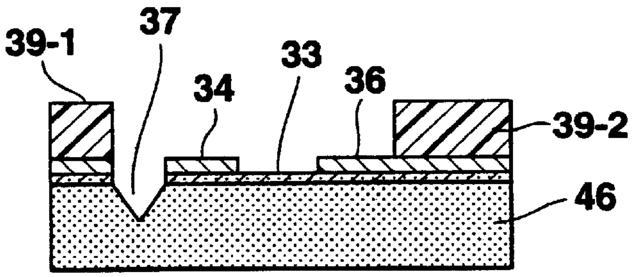
FIGS. 17A through 17E are exemplary cross-sectional views showing a method of manufacturing an ink-jet printer head according to a third embodiment of this invention step by step for each of the essential stages.
Figure 17B:
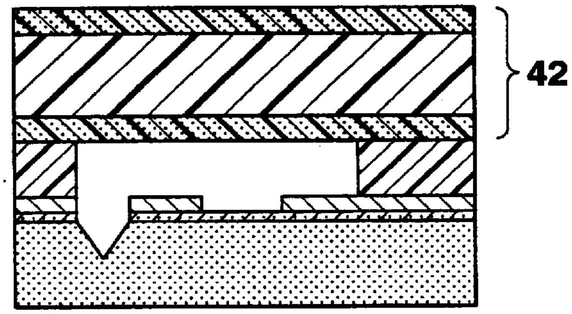
Figure 17C:
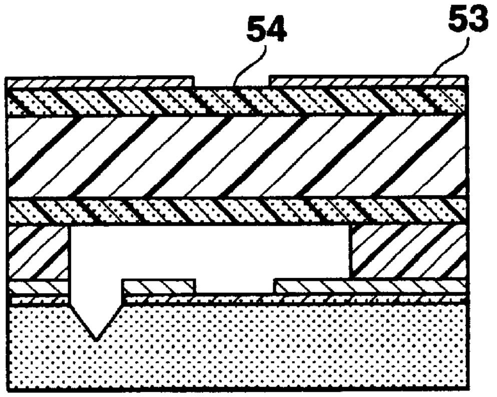

FIGS. 17A through 17E are exemplary diagrams showing a method of manufacturing an ink-jet printer head according to the third embodiment. Since the structure illustrates in FIGS. 17A–17C is substantially the same as the structure in FIG. 9A except for a slight difference in the order of the fabrication steps, same reference numerals are given to those components which are the same as the corresponding components shown in FIG. 9A.

Figure 17D:
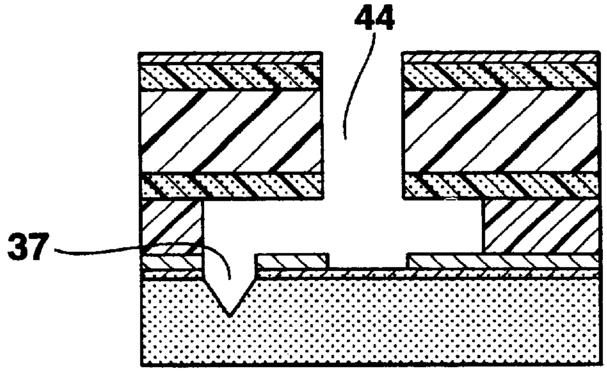

According to this third embodiment, first, after unillustrated drives are formed on the chip substrate 46, the heat generating sections 33, the common electrode 34, the individual wiring electrodes 36 and the partition 39 are formed, followed by the forming of the common ink feed groove 37 as shown in FIG. 17A. Then, the orifice plate 42 is laminated as shown in FIG. 17B, and the metal film 53 is formed on which the mask pattern 54 is formed as shown in FIG. 17C. After only processing from the surface side of the chip substrate 46 is performed this way, the process goes to the boring step by helicon-wave dry etching to form the orifices 44 as shown in FIG. 17D. After this, the ink feed hole 38 is bored through from the bottom side of the chip substrate 46 so as to communicate with the common ink feed groove 37 on the top surface side so that the ink feed passage penetrates through the chip substrate 46.

Figure 17E:
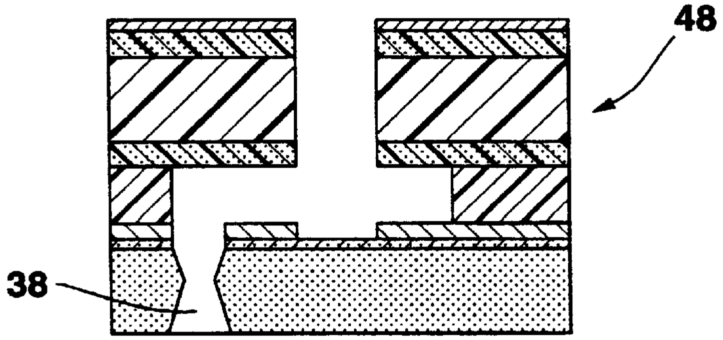

As apparent from the above, the forming of the ink feed hole 38 as shown in FIG. 17E that involves boring from the bottom side of the chip substrate 46 has not carried out yet at the stage of helicon-wave dry etching shown in FIG. 17D, so that the ink feed passage in the chip substrate 46 has not penetrated yet at the tire of the penetration of the orifices 44. Therefore, the coolant gas 66 shown in FIG. 11C that stays at the bottom side of the chip substrate 46 does not escape to the top surface side from the orifices 44. As in the first and second embodiments, therefore, the uniform cooling state as obtained before the penetration of the orifices 44 can be maintained even after the orifices 44 are bored through. The third embodiment can therefore ensure sufficient over-etching, and can permit a plurality of orifices 44 of the desired and adequate shape to be formed simultaneously.

A fourth embodiment of this invention will now be discussed.

Figure 18A:
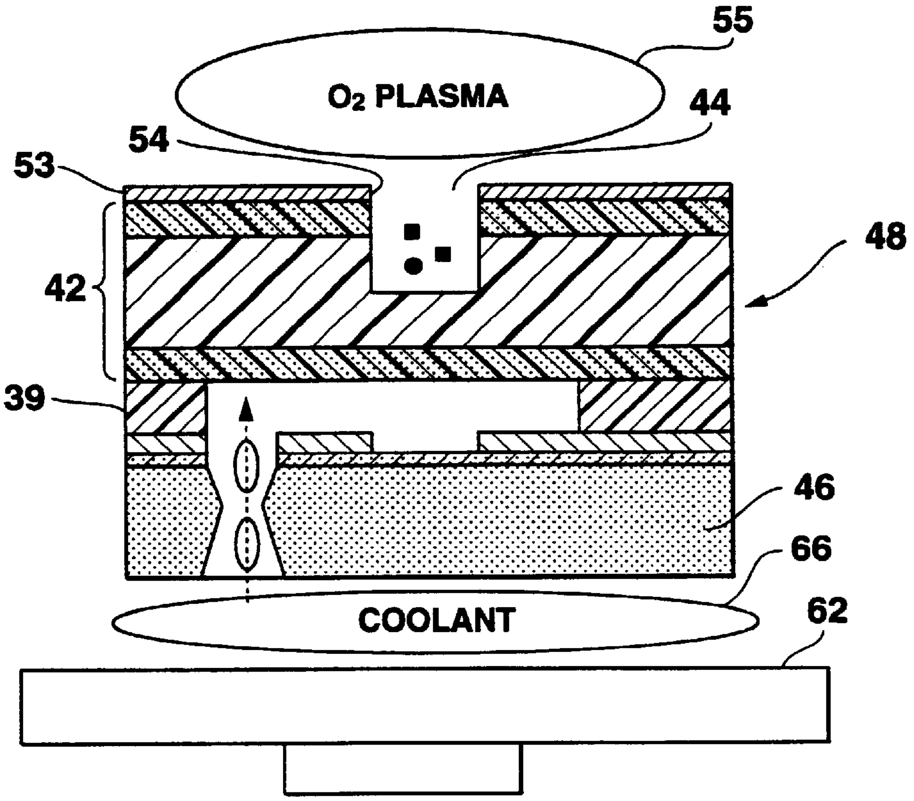
FIG. 18A is an exemplary cross-sectional view showing the state before orifices are bored through in a method of manufacturing an ink-jet printer head according to a fourth embodiment of this invention.
Figure 18B:
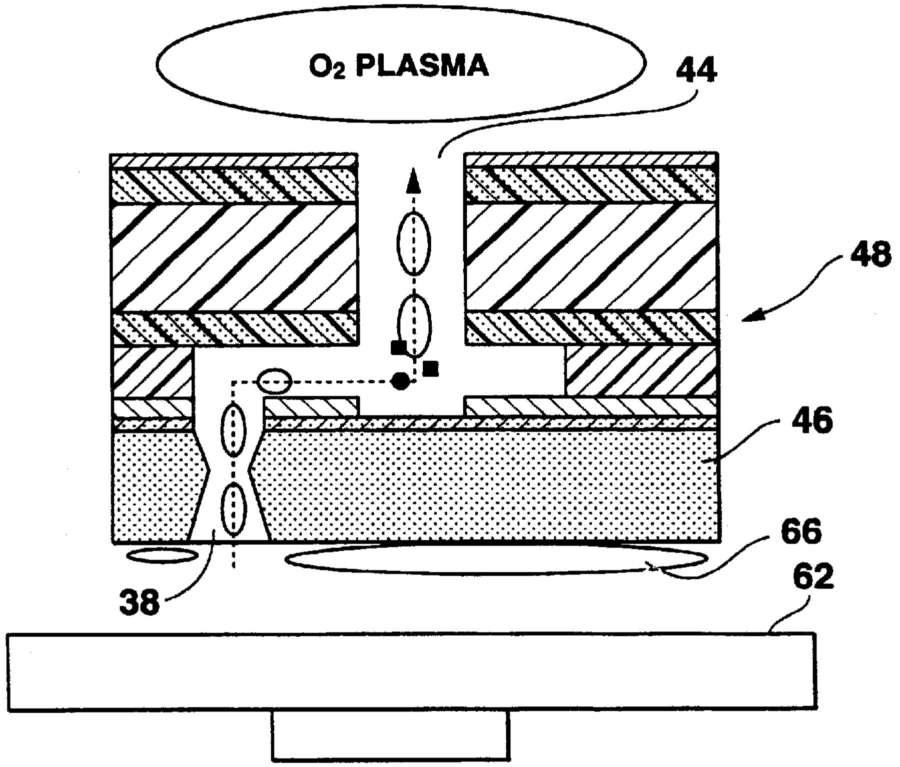
FIG. 18B is an exemplary cross-sectional view showing the state after orifices are bored through in a method of manufacturing an ink-jet printer head according to the fourth embodiment of this invention.

FIGS. 18A and 18B are exemplary diagrams showing a method of manufacturing an ink-jet printer head according to the fourth embodiment.

According to this fourth embodiment, first, as shown in FIG. 18A, the orifices 44 are bored through by helicon-wave dry etching illustrated in FIGS. 11A–11C. The process conditions in this case are the same as those of the first embodiment. As shown in FIG. 18B, immediately after all the orifices 44 are substantially bored through, the coolant feeding pump 67 is deactivated to stop the ejection of the coolant gas 66 from the coolant ejection ports 69 in the wafer chuck stage 62 (see FIGS. 11A–11C). A method of detecting the penetration of the orifices 44 will be discussed later.

As the ejection of the coolant gas 66 from the coolant ejection ports 69 in the wafer chuck stage 62 stops, the flow of the coolant gas 66 stops and the inertia and pressure of the flow drop so that it is only the coolant gas 66 near the ink feed hole 38 that slightly escapes toward the bored orifices 44. Most of the coolant gas 66 uniformly stays in the clearance between the back of the chip substrate 46 and the top surface of the wafer chuck stage 62. This can allow the function of the residence coolant gas 66 to cool the substrate to be maintained, though short it is. Over-etching is performed before the residence coolant gas 66 is scattered.

Figure 19:
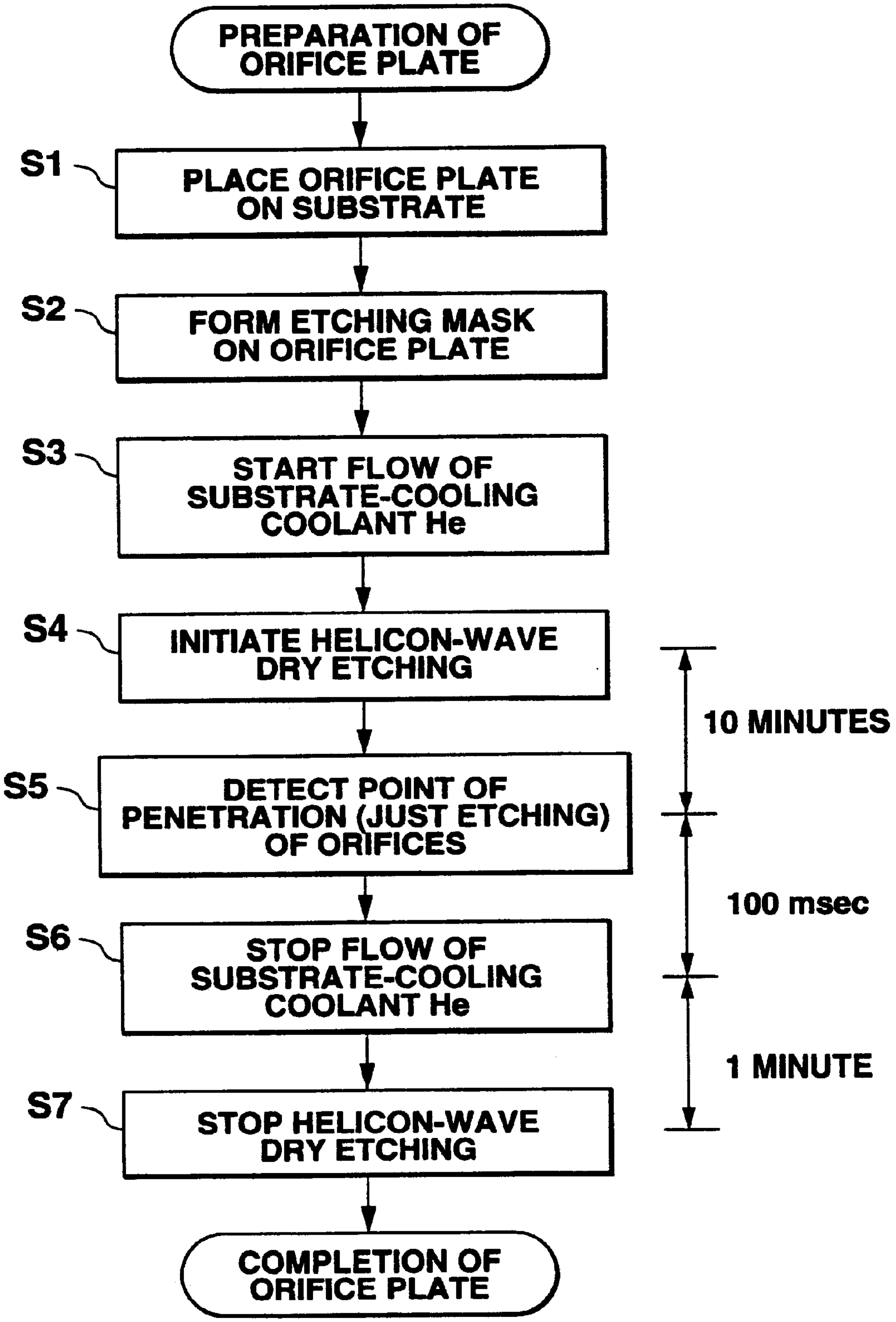
FIG. 19 is a flowchart illustrating the method of manufacturing an ink-jet printer head according to the fourth embodiment of this invention.

FIG. 19 is a flowchart illustrating procedures for helicon-wave dry etching according to the fourth embodiment. As shown in this flowchart, first, the orifice plate 42 is placed on the substrate (silicon wafer 47) or it is securely laminated on the partition 39 (step S1). Next, the metal film 53 is formed on the surface of the orifice plate 42, followed by the forming of the pattern 54 on the metal film 53 (step S2).

Subsequently, this substrate 47 is placed in the helicon-wave dry etching system and is secured on the wafer chuck stage 62. Further, the low-temperature circulator 65 (see FIG. 6) is activated to circulate the antifreezing liquid and the coolant feeding pump 67 is activated to start the flow of the coolant gas (He) 66 for cooling the substrate 47 so that the coolant gas 66 is fed to the space between the substrate 47 and the wafer chuck stage 62 (step S3).

Next, helicon-wave dry etching is initiated and penetration of the orifices 44 is monitored (step S4). In this etching process, the penetration of the orifices 44 takes about 10 minutes. When the penetration of the orifices 44 is detected after about 10 minutes (step S5), the coolant feeding pump 67 is deactivated to stop the flow of the coolant gas 66 between the substrate 47 and the wafer chuck stage 62 (stop S6). This process takes approximately 100 msec.

Then, after etching is resumed for one minute, i.e., after over-etching is performed for one minute, helicon-wave dry etching is stopped (step S7). This completes the boring of the orifices 44 in the orifice plate 42.

According to this embodiment, although the time needed for the penetration of the orifices 44 or 10 minutes, one of the above-described conditions in the first embodiment, is not changed, cooling the substrate after the penetration of the orifices 44 uses only the residence coolant gas 66. This makes it necessary to set a shorter time for over-etching, which is one minute.

A description will now be given of how to detect the timing at which almost all the orifices 44 are bored through, i.e., the just etching timing. The detection of the penetration of the orifices 44 can be accomplished by using various kinds of methods, such as emission spectral analysis, reflection spectral analysis, gas analysis, pressure measuring scheme and flow-rate measuring scheme.

The emission spectral analysis detects the light which has a specific wavelength to a reaction product or reaction gas produced in the plasma etching process in helicon-wave dry etching and monitors a change in light intensity with passage of time. Around the end point, the material that contributes to the reaction is reduced so that a change appears in the signal being monitored. According to this embodiment, the light whose wavelength is specific to the reaction product or reaction gas that is produced by polyimide is detected.

According to the reflection spectral analysis, when a target is comprised of a substance to be etched and the substrate, the reflected light from the substance to be etched is observed during etching and the reflected light from the substrate is observed after the penetration of the orifices 44. In this embodiment, the reflected light from polyimide of the orifice plate 42 is detected during etching and the reflected light from Si, the wiring material (Au, A1 or the like) or the resistor element (Ta—Si—O or the like) is detected after the penetration of the orifices 44.

During etching in which the orifices 44 are not bored through the orifice plate 42 yet, the coolant gas 66 which is flowing in the clearance between the bottom side of the substrate and the wafer chuck stage 62 does not come out of the substrate surface. Immediately after the penetration of the orifices 44, however, the coolant gas 66 flows out of the substrate surface. The gas analysis detects the ejected coolant gas. In this embodiment, for example, He is detected.

In consideration of the same phenomenon as described in the previous description of the gas analysis, the pressure measuring scheme detects the end of etching by detecting a change in the pressure of the coolant gas before and after the penetration of the orifices 44.

Likewise, in consideration of the same phenomenon as described in the description of the gas analysis, the flow-rate measuring scheme detects the point at which the flow rate of the coolant gas 66 which has increased significantly becomes stable at that large flow rate as the end of etching.

This invention is not limited to a roof-shooter type ink-jet printer head but may be adapted to a side-shooter type thermal ink-jet printer head as well. Further, this invention is not limited to a thermal type ink-jet printer head but may be adapted to a piezoelectric type ink-jet printer head as well.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No: H11-23373 filed on Feb. 22, 1999 and including specification, claims, drawings and summary. This application is also based on Japanese Patent Application No. H11-187516 filed on Jul. 1, 1999 and including specification, claims, drawings and summary. The disclosure of the above Japanese Patent Application is incorporated herein by reference in its entirety.

What is claimed is:

1. A method of manufacturing an ink jet printer head having a substrate provided with a plurality of energy generating elements for generating pressure energy for ejecting ink and an orifice plate located on said substrate and having a plurality of ejection nozzles formed therein for ejecting ink in a predetermined direction by pressure generated by said energy generating elements, said method comprising the steps of:

forming an etching mask film having a pattern corresponding to said ejection nozzles in said orifice plate before formation of said ejection nozzles;

forming said plurality of ejection nozzles in said orifice plate by helicon-wave dry etching while cooling the ink jet printer head substrate having said orifice plate with said mask film placed on a bottom of said substrate with a coolant gas; and forming an ink feed passage between from said bottom of said substrate to a top surface thereof, and wherein said ink feed passage is blocked before supply of said coolant gas starts and after said step of forming the ink feed passage, after formation of said ejection nozzles is complete, supply of said coolant gas is stopped, and blocking of said ink feed passage is released.

2. The method according to claim 1, wherein said orifice plate is a multilayer sheet comprising a polyimide sheet having a thermoplastic adhesive layer having a glass transition point higher than 200° C. deposited on a top side and a bottom side of the polyimide sheet.

3. The method according to claim 2, wherein said printer head substrate is cooled to 200° C. or less.

4. The method according to claim 1, wherein said printer head substrate is cooled by cooling a bottom of said substrate with a coolant gas.

5. The method according to claim 1, wherein said ink feed passage is blocked by adhering a block sheet on said bottom of said substrate, and said blocking of said ink feed passage is released by removing said block sheet.

* * * * *